US012694831B2

(12) United States Patent
Kim et al.

(10) Patent No.: US 12,694,831 B2
(45) **Date of Patent: *Jul. 28, 2026**

(54) GATE SIGNAL MASKING CIRCUIT, GATE EMISSION DRIVER INCLUDING THE SAME AND DISPLAY APPARATUS INCLUDING THE SAME

(71) Applicant: Samsung Display Co., LTD., Yongin-si (KR)

(72) Inventors: Kyungho Kim, Yongin-si (KR); Nahyeon Cha, Yongin-si (KR); Sang Yong No, Yongin-si (KR)

(73) Assignee: SAMSUNG DISPLAY CO., LTD., Gyeonggi-Do (KR)

( * ) Notice: Subject to any disclaimer, the term of this patent is extended or adjusted under 35 U.S.C. 154(b) by 0 days.

This patent is subject to a terminal disclaimer.

(21) Appl. No.: 18/966,617

(22) Filed: Dec. 3, 2024

(65) Prior Publication Data

US 2025/0209985 A1 Jun. 26, 2025

(30) Foreign Application Priority Data

Dec. 20, 2023 (KR) ........................ 10-2023-0187775

(51) Int. Cl.
*G09G 3/3233* (2016.01)
*G09G 3/32* (2016.01)
*G09G 3/3291* (2016.01)

(52) U.S. Cl.
CPC ............. *G09G 3/3233* (2013.01); *G09G 3/32* (2013.01); *G09G 3/3291* (2013.01);
(Continued)

(58) Field of Classification Search
CPC ...... G09G 3/3233; G09G 3/32; G09G 3/3291; G09G 2300/0426; G09G 2300/0819;
(Continued)

(56) References Cited

U.S. PATENT DOCUMENTS 11,308,857 B2 * 4/2022 In ......................... G09G 3/3674
2017/0301295 A1 * 10/2017 Park ..................... G09G 3/3258
(Continued)

FOREIGN PATENT DOCUMENTS

KR 1020190112876 A 10/2019
KR 1020230049175 A 4/2023
(Continued)

*Primary Examiner* — Kwang-Su Yang
(74) *Attorney, Agent, or Firm* — CANTOR COLBURN LLP

(57) ABSTRACT

A gate signal masking circuit includes a first switching element including a control electrode connected to a masking control node, a first electrode connected to a first node and a second electrode connected to a control node, a second switching element including a control electrode connected to a second node, a first electrode receiving a first power voltage and a second electrode connected to an intermediate node, a third switching element including a control electrode receiving an enable signal, a first electrode connected to the intermediate node and a second electrode connected to the masking control node, a fourth switching element including a control electrode receiving the enable signal, a first electrode connected to the masking control node and a second electrode connected to a second intermediate node, a fifth switching element connected to a third node and the second intermediate node and receiving a second power voltage.

27 Claims, 16 Drawing Sheets

(52) U.S. Cl.
CPC ............... *G09G 2300/0426* (2013.01); *G09G 2300/0819* (2013.01); *G09G 2300/0852* (2013.01); *G09G 2300/0861* (2013.01); *G09G 2320/045* (2013.01); *G09G 2330/021* (2013.01)

(58) Field of Classification Search
CPC ... G09G 2300/0852; G09G 2300/0861; G09G 2320/045; G09G 2330/021
See application file for complete search history.

(56) References Cited

U.S. PATENT DOCUMENTS

2024/0265847 A1* 8/2024 Kim ..................... G09G 3/3266
2025/0104629 A1* 3/2025 Kim ..................... G09G 3/3233

FOREIGN PATENT DOCUMENTS

KR 1020240068866 A 5/2024
KR 1020240123892 A 8/2024

* cited by examiner

FIG. 11

| | INPUT | | | OUTPUT |
|---|---|---|---|---|
| CONDITION | EN | EM[n] | EM_B[n] | S_node |
| CN1 | HIGH | HIGH | LOW | HOLD |
| CN2 | HIGH | LOW | HIGH | LOW |
| CN3 | LOW | HIGH | LOW | HOLD |
| CN4 | LOW | LOW | HIGH | HIGH |

GATE SIGNAL MASKING CIRCUIT, GATE EMISSION DRIVER INCLUDING THE SAME AND DISPLAY APPARATUS INCLUDING THE SAME

This application claims priority to Korean Patent Application No. 10-2023-0187775, filed on Dec. 20, 2023, and all the benefits accruing therefrom under 35 U.S.C. § 119, the content of which in its entirety is herein incorporated by reference.

BACKGROUND

1. Field

Embodiments of the invention relate to a gate signal masking circuit, a gate emission driver including the gate signal masking circuit and a display apparatus including the gate emission driver. More particularly, embodiments of the invention relate to a gate signal masking circuit with reduced power consumption, a gate emission driver including the gate signal masking circuit and a display apparatus including the gate emission driver.

2. Description of the Related Art

Generally, a display apparatus includes a display panel and a display panel driver. The display panel may include a plurality of gate lines, a plurality of data lines, a plurality of emission lines and a plurality of pixels. The display panel driver may include a gate driver, a data driver and a driving controller. The gate driver may output gate signals to the gate lines. The data driver outputs data voltages to the data lines. The driving controller may control the gate driver and the data driver.

When an image to be displayed on the display panel is a static image or the display panel is operated in an always-on mode, a driving frequency of the display panel may be decreased to reduce a power consumption.

SUMMARY

When a portion of an image to be displayed on a display panel is a static image and a portion of the image to be displayed on the display panel is a moving image, it is desired to reduce a driving frequency of the portion of the display panel corresponding to the static image to further reduce the power consumption.

However, a stage of the gate driver receives an output of a previous stage as a carry signal to output the gate signal such that the driving frequency of only a portion of the display panel may not be decreased.

Embodiments of the invention provide a gate signal masking circuit that supports a multiple division of a driving frequency to reduce a power consumption of the display apparatus.

Embodiments of the invention also provide a gate emission driver including the gate signal masking circuit.

Embodiments of the invention also provide a display apparatus including the gate emission driver.

In an embodiment of a gate signal masking circuit according to the invention, the gate signal masking circuit includes a first switching element, a second switching element, a third switching element, a fourth switching element and a fifth switching element. In such an embodiment, the first switching element includes a control electrode connected to a masking control node, a first electrode connected to a first input node and a second electrode connected to an output control node. In such an embodiment, the second switching element includes a control electrode connected to a second input node, a first electrode which receives a first power voltage and a second electrode connected to a first intermediate node. In such an embodiment, the third switching element includes a control electrode which receives an enable signal, a first electrode connected to the first intermediate node and a second electrode connected to the masking control node. In such an embodiment, the fourth switching element includes a control electrode which receives the enable signal, a first electrode connected to the masking control node and a second electrode connected to a second intermediate node. In such an embodiment, the fifth switching element includes a control electrode connected to a third input node, a first electrode connected to the second intermediate node and a second electrode which receives a second power voltage. In such an embodiment, the second switching element and the third switching element are P-type transistors, and the fourth switching element and the fifth switching element are N-type transistors.

In an embodiment, the gate signal masking circuit may further include a sixth switching element including a control electrode connected to the output control node, a first electrode which receives the first power voltage and a second electrode connected to a gate output node and a seventh switching element including a control electrode connected to the first input node, a first electrode connected to the gate output node and a second electrode which receives the second power voltage.

In an embodiment, the gate signal masking circuit may further include an eighth switching element including a control electrode connected to the masking control node, a first electrode which receives the first power voltage and a second electrode connected to the output control node.

In an embodiment, the gate signal masking circuit may further include a first capacitor including a first electrode connected to the masking control node and a second electrode which receives the second power voltage.

In an embodiment, a signal of the third input node may be an inverted signal of a signal of the second input node.

In an embodiment, when the enable signal has a high level and a signal of the second input node has a high level, a signal of the masking control node may be which maintain a previous status.

In an embodiment, when the enable signal has a high level and a signal of the second input node has a low level, a signal of the masking control node may be which have a low level.

In an embodiment, when the enable signal has a low level and a signal of the second input node has a high level, a signal of the masking control node may maintain a previous status.

In an embodiment, when the enable signal has a low level and a signal of the second input node has a low level, a signal of the masking control node may have a high level.

In an embodiment of a gate emission driver according to the invention, the gate emission driver includes a first driver, a second driver and a gate signal masking circuit. In such an embodiment, the first driver generates a carry signal based on a previous carry signal. In such an embodiment, the second driver generates an emission signal based on a previous emission signal. In such an embodiment, the gate signal masking circuit controls an output of a gate signal based on an enable signal, a signal of a first input node of the first driver and a signal of a second input node of the second driver and a signal of a third input node of the second driver.

In an embodiment, the gate signal masking circuit may include a first switching element including a control electrode connected to a masking control node, a first electrode connected to the first input node and a second electrode connected to an output control node, a second switching element including a control electrode connected to the second input node, a first electrode which receives a first power voltage and a second electrode connected to a first intermediate node, a third switching element including a control electrode which receives the enable signal, a first electrode connected to the first intermediate node and a second electrode connected to the masking control node, a fourth switching element including a control electrode which receives the enable signal, a first electrode connected to the masking control node and a second electrode connected to a second intermediate node and a fifth switching element including a control electrode connected to the third input node, a first electrode connected to the second intermediate node and a second electrode which receives a second power voltage. In such an embodiment, the second switching element and the third switching element may be P-type transistors, and the fourth switching element and the fifth switching element may be N-type transistors.

In an embodiment, the gate signal masking circuit may further include a sixth switching element including a control electrode connected to the output control node, a first electrode which receives the first power voltage and a second electrode connected to a gate output node, a seventh switching element including a control electrode connected to the first input node, a first electrode connected to the gate output node and a second electrode which receives the second power voltage and an eighth switching element including a control electrode connected to the masking control node, a first electrode which receives the first power voltage and a second electrode connected to the output control node.

In an embodiment, the first driver may include a first gate switching element including a control electrode which receives one of a first clock signal and a second clock signal, a first electrode which receives the previous carry signal and a second electrode connected to a first gate node, a second gate switching element including a control electrode which receives the other of the first clock signal and the second clock signal, a first electrode which receives the previous carry signal and a second electrode connected to the first gate node, a third gate switching element including a control electrode connected to the first gate node, a first electrode which receives the first power voltage and a second electrode connected to a second gate node, a fourth gate switching element including a control electrode connected to the first gate node, a first electrode connected to the second gate node and a second electrode which receives the second power voltage, a fifth gate switching element including a control electrode connected to the second gate node, a first electrode which receives the first power voltage and a second electrode connected to a carry output node and a sixth gate switching element including a control electrode connected to the second gate node, a first electrode connected to the carry output node and a second electrode which receives the second power voltage. In such an embodiment, the first gate switching element, the third gate switching element and the fifth gate switching element may be P-type transistors, and the second gate switching element, the fourth gate switching element and the sixth gate switching element may be N-type transistors.

In an embodiment, the first input node may be connected to the second gate node.

In an embodiment, the first driver may include a first gate switching element including a control electrode which receives one of a first clock signal and a second clock signal, a first electrode which receives the previous carry signal and a second electrode connected to a first gate node, a third gate switching element including a control electrode connected to the first gate node, a first electrode which receives the first power voltage and a second electrode connected to a second gate node, a fourth gate switching element including a control electrode connected to the first gate node, a first electrode connected to the second gate node and a second electrode which receives the second power voltage, a fifth gate switching element including a control electrode connected to the second gate node, a first electrode which receives the first power voltage and a second electrode connected to a carry output node and a sixth gate switching element including a control electrode connected to the second gate node, a first electrode connected to the carry output node and a second electrode which receives the second power voltage. In such an embodiment, the first gate switching element, the third gate switching element and the fifth gate switching element may be P-type transistors, and the fourth gate switching element and the sixth gate switching element may be N-type transistors.

In an embodiment, the second driver may include a first emission switching element including a control electrode which receives one of a first clock signal and a second clock signal, a first electrode which receives the previous emission signal and a second electrode connected to a first emission node, a second emission switching element including a control electrode which receives the other of the first clock signal and the second clock signal, a first electrode which receives the previous emission signal and a second electrode connected to the first emission node, a third emission switching element including a control electrode connected to the first emission node, a first electrode which receives the first power voltage and a second electrode connected to a second emission node, a fourth emission switching element including a control electrode connected to the first emission node, a first electrode connected to the second emission node and a second electrode which receives the second power voltage, a fifth emission switching element including a control electrode connected to the second emission node, a first electrode which receives the first power voltage and a second electrode connected to an emission output node and a sixth emission switching element including a control electrode connected to the second emission node, a first electrode connected to the emission output node and a second electrode which receives the second power voltage. In such an embodiment, the first emission switching element, the third emission switching element and the fifth emission switching element may be P-type transistors, and the second emission switching element, the fourth emission switching element and the sixth emission switching element may be N-type transistors.

In an embodiment, the second input node may be connected to the emission output node, and the third input node may be connected to the second emission node.

In an embodiment, the second driver may include a first emission switching element including a control electrode which receives one of a first clock signal and a second clock signal, a first electrode which receives the previous emission signal and a second electrode connected to a first emission node, a third emission switching element including a control electrode connected to the first emission node, a first electrode which receives the first power voltage and a second electrode connected to a second emission node, a fourth emission switching element including a control electrode connected to the first emission node, a first electrode connected to the second emission node and a second electrode which receives the second power voltage, a fifth emission switching element including a control electrode connected to the second emission node, a first electrode which receives the first power voltage and a second electrode connected to an emission output node and a sixth emission switching element including a control electrode connected to the second emission node, a first electrode connected to the emission output node and a second electrode which receives the second power voltage. In such an embodiment, the first emission switching element, the third emission switching element and the fifth emission switching element may be P-type transistors, and the fourth emission switching element and the sixth emission switching element may be N-type transistors.

In an embodiment of a display apparatus according to the invention, the display apparatus includes a display panel, a gate emission driver and a data driver. In such an embodiment, the display panel includes a pixel. In such an embodiment, the gate emission driver outputs a gate signal and an emission signal to the pixel. In such an embodiment, the data driver outputs a data voltage to the pixel. In such an embodiment, the gate emission driver includes a first driver which generates a carry signal based on a previous carry signal, a second driver which generate the emission signal based on a previous emission signal and a gate signal masking circuit which controls an output of the gate signal based on an enable signal, a signal of a first input node of the first driver and a signal of a second input node of the second driver and a signal of a third input node of the second driver.

In an embodiment, the gate signal masking circuit may include a first switching element including a control electrode connected to a masking control node, a first electrode connected to the first input node and a second electrode connected to an output control node, a second switching element including a control electrode connected to the second input node, a first electrode which receives a first power voltage and a second electrode connected to a first intermediate node, a third switching element including a control electrode which receives the enable signal, a first electrode connected to the first intermediate node and a second electrode connected to the masking control node, a fourth switching element including a control electrode which receives the enable signal, a first electrode connected to the masking control node and a second electrode connected to a second intermediate node and a fifth switching element including a control electrode connected to the third input node, a first electrode connected to the second intermediate node and a second electrode which receives a second power voltage. In such an embodiment, the second switching element and the third switching element are P-type transistors, and the fourth switching element and the fifth switching element are N-type transistors.

In an embodiment, the gate signal masking circuit may further include a sixth switching element including a control electrode connected to the output control node, a first electrode which receives the first power voltage and a second electrode connected to a gate output node, a seventh switching element including a control electrode connected to the first input node, a first electrode connected to the gate output node and a second electrode which receives the second power voltage and an eighth switching element including a control electrode connected to the masking control node, a first electrode which receives the first power voltage and a second electrode connected to the output control node.

In an embodiment, the first driver may include a first gate switching element including a control electrode which receives one of a first clock signal and a second clock signal, a first electrode which receives the previous carry signal and a second electrode connected to a first gate node, a first gate switching element including a control electrode which receives the other of the first clock signal and the second clock signal, a first electrode which receives the previous carry signal and a second electrode connected to the first gate node, a third gate switching element including a control electrode connected to the first gate node, a first electrode which receives the first power voltage and a second electrode connected to a second gate node, a fourth gate switching element including a control electrode connected to the first gate node, a first electrode connected to the second gate node and a second electrode which receives the second power voltage, a fifth gate switching element including a control electrode connected to the second gate node, a first electrode which receives the first power voltage and a second electrode connected to a carry output node and a sixth gate switching element including a control electrode connected to the second gate node, a first electrode connected to the carry output node and a second electrode which receives the second power voltage. In such an embodiment, the first gate switching element, the third gate switching element and the fifth gate switching element may be P-type transistors, and the second gate switching element, the fourth gate switching element and the sixth gate switching element may be N-type transistors.

In an embodiment, the first input node may be connected to the second gate node.

In an embodiment, the pixel may include a first pixel switching element including a control electrode connected to a first pixel node, a first electrode connected to a second pixel node and a second electrode connected to a third pixel node, a second pixel switching element including a control electrode which receives a data writing gate signal, a first electrode which receives the data voltage and a second electrode connected to the second pixel node, a third pixel switching element including a control electrode which receives a compensation gate signal, a first electrode connected to the first pixel node and a second electrode connected to the third pixel node, a fourth pixel switching element including a control electrode which receives a data initialization gate signal, a first electrode which receives an initialization voltage and a second electrode connected to the first pixel node, a fifth pixel switching element including a control electrode which receives the emission signal, a first electrode which receives a pixel high power voltage and a second electrode connected to the second pixel node, a sixth pixel switching element including a control electrode which receives the emission signal, a first electrode connected to the third pixel node and a second electrode connected to an anode electrode of a light emitting element, a seventh pixel switching element including a control electrode which receives a light emitting element initialization gate signal, a first electrode which receives a light emitting element initialization voltage and a second electrode connected to the anode electrode of the light emitting element and the light emitting element including the anode electrode and a cathode electrode which receives a pixel low power voltage. In such an embodiment, the gate signal may be the compensation gate signal.

In an embodiment, the pixel may include a first pixel switching element including a control electrode connected to a first pixel node, a first electrode connected to a second pixel node and a second electrode connected to a third pixel node, a second pixel switching element including a control electrode which receives a data writing gate signal, a first electrode which receives the data voltage and a second electrode connected to the second pixel node, a third pixel switching element including a control electrode which receives a compensation gate signal, a first electrode connected to the first pixel node and a second electrode connected to the third pixel node, a fourth pixel switching element including a control electrode which receives a data initialization gate signal, a first electrode which receives an initialization voltage and a second electrode connected to the first pixel node, a fifth pixel switching element including a control electrode which receives the emission signal, a first electrode which receives a pixel high power voltage and a second electrode connected to the second pixel node, a sixth pixel switching element including a control electrode which receives the emission signal, a first electrode connected to the third pixel node and a second electrode connected to an anode electrode of a light emitting element, a seventh pixel switching element including a control electrode which receives a light emitting element initialization gate signal, a first electrode which receives a light emitting element initialization voltage and a second electrode connected to the anode electrode of the light emitting element and the light emitting element including the anode electrode and a cathode electrode which receives a pixel low power voltage. In such an embodiment, the gate signal may be the data initialization gate signal.

In an embodiment, the pixel may include a first pixel switching element including a control electrode connected to a first pixel node, a first electrode connected to a second pixel node and a second electrode connected to a third pixel node, a second pixel switching element including a control electrode which receives a data writing gate signal, a first electrode which receives the data voltage and a second electrode connected to the second pixel node, a third pixel switching element including a control electrode which receives a compensation gate signal, a first electrode connected to the first pixel node and a second electrode connected to the third pixel node, a fourth pixel switching element including a control electrode which receives a data initialization gate signal, a first electrode which receives an initialization voltage and a second electrode connected to the first pixel node, a fifth pixel switching element including a control electrode which receives the emission signal, a first electrode which receives a pixel high power voltage and a second electrode connected to the second pixel node, a sixth pixel switching element including a control electrode which receives the emission signal, a first electrode connected to the third pixel node and a second electrode connected to an anode electrode of a light emitting element, a seventh pixel switching element including a control electrode which receives a light emitting element initialization gate signal, a first electrode which receives a light emitting element initialization voltage and a second electrode connected to the anode electrode of the light emitting element and the light emitting element including the anode electrode and a cathode electrode which receives a pixel low power voltage. In such an embodiment, the light emitting element initialization gate signal may be a data writing gate signal of a previous stage, and the gate signal may be the data initialization gate signal.

In an embodiment, the pixel may include a first pixel switching element including a control electrode connected to a first pixel node, a first electrode connected to a second pixel node and a second electrode connected to a third pixel node, a second pixel switching element including a control electrode which receives a data writing gate signal, a first electrode which receives the data voltage and a second electrode connected to the second pixel node, a third pixel switching element including a control electrode which receives a compensation gate signal, a first electrode connected to the first pixel node and a second electrode connected to the third pixel node, a fourth pixel switching element including a control electrode which receives a data initialization gate signal, a first electrode which receives an initialization voltage and a second electrode connected to the first pixel node, a fifth pixel switching element including a control electrode which receives the emission signal, a first electrode which receives a pixel high power voltage and a second electrode connected to the second pixel node, a sixth pixel switching element including a control electrode which receives the emission signal, a first electrode connected to the third pixel node and a second electrode connected to an anode electrode of a light emitting element, a seventh pixel switching element including a control electrode which receives a light emitting element initialization gate signal, a first electrode which receives a light emitting element initialization voltage and a second electrode connected to the anode electrode of the light emitting element, an eighth pixel switching element including a control electrode which receives a bias gate signal, a first electrode which receives a bias voltage and a second electrode connected to the second pixel node and the light emitting element including the anode electrode and a cathode electrode which receives a pixel low power voltage. In such an embodiment, the gate signal may be one of the compensation gate signal and the data initialization gate signal.

According to embodiments of the gate signal masking circuit, the gate emission driver and the display apparatus, the output of the gate signal may be controlled based on the enable signal, the signal of the first input node of the first driver and the signal of the second input node of the second driver and the signal of the third input node of the second driver such that the multiple division of the driving frequency may be supported.

In such embodiments, the power consumption of the display apparatus may be effectively reduced through the multiple division of the driving frequency. In addition, the multiple division of the driving frequency of the gate signal having two or more pulses may be supported.

BRIEF DESCRIPTION OF THE DRAWINGS

The above and other features of embodiments of the invention will become more apparent by describing in detailed embodiments thereof with reference to the accompanying drawings, in which:

FIG. 11 is a table illustrating a status of a signal of a masking control node according to an input signal of the gate signal masking circuit of FIG. 9;

DETAILED DESCRIPTION

Figure 1:
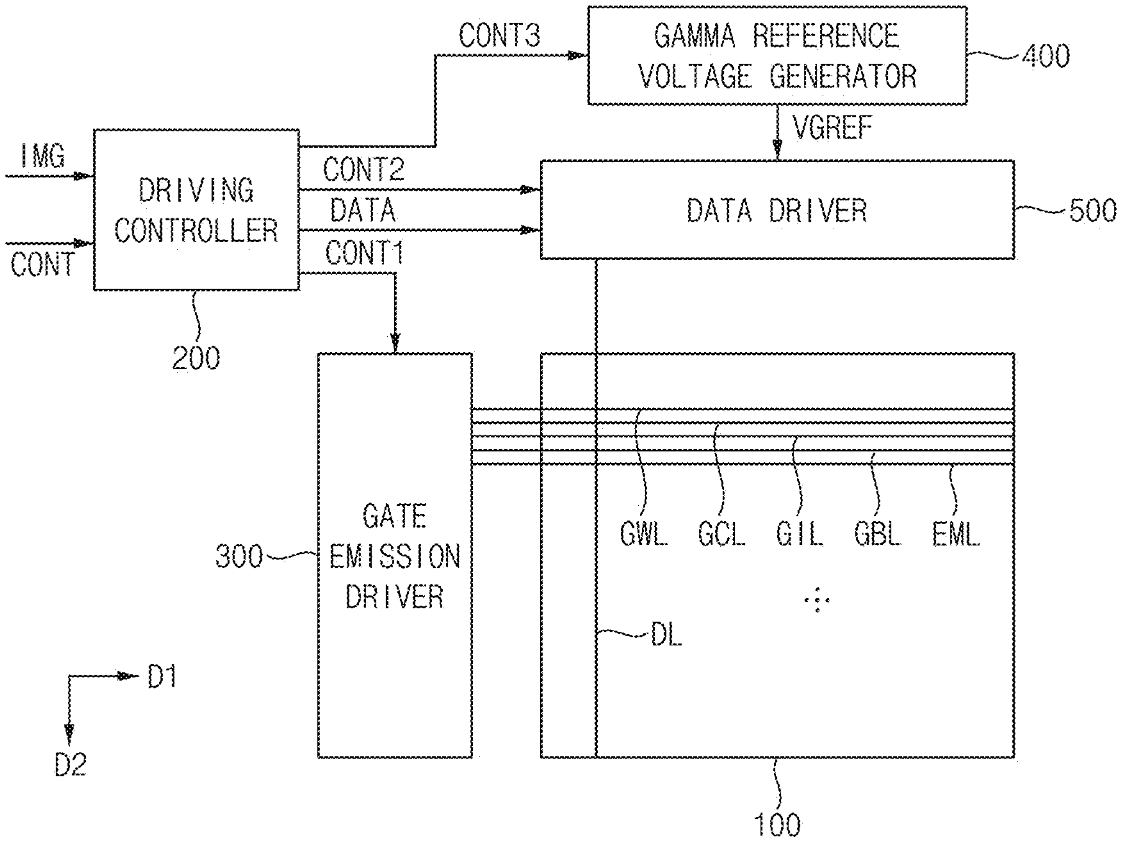
FIG. 1 is a block diagram illustrating a display apparatus according to an embodiment of the invention.

The invention now will be described more fully hereinafter with reference to the accompanying drawings, in which various embodiments are shown. This invention may, however, be embodied in many different forms, and should not be construed as limited to the embodiments set forth herein. Rather, these embodiments are provided so that this disclosure will be thorough and complete, and will fully convey the scope of the invention to those skilled in the art. Like reference numerals refer to like elements throughout.

It will be understood that when an element is referred to as being "on" another element, it can be directly on the other element or intervening elements may be present therebetween. In contrast, when an element is referred to as being "directly on" another element, there are no intervening elements present.

It will be understood that, although the terms "first," "second," "third" etc. may be used herein to describe various elements, components, regions, layers and/or sections, these elements, components, regions, layers and/or sections should not be limited by these terms. These terms are only used to distinguish one element, component, region, layer or section from another element, component, region, layer or section. Thus, "a first element," "component," "region," "layer" or "section" discussed below could be termed a second element, component, region, layer or section without departing from the teachings herein.

The terminology used herein is for the purpose of describing particular embodiments only and is not intended to be limiting. As used herein, "a", "an," "the," and "at least one" do not denote a limitation of quantity, and are intended to include both the singular and plural, unless the context clearly indicates otherwise. Thus, reference to "an" element in a claim followed by reference to "the" element is inclusive of one element and a plurality of the elements. For example, "an element" has the same meaning as "at least one element," unless the context clearly indicates otherwise. "At least one" is not to be construed as limiting "a" or "an." "Or" means "and/or." As used herein, the term "and/or" includes any and all combinations of one or more of the associated listed items. It will be further understood that the terms "comprises" and/or "comprising," or "includes" and/or "including" when used in this specification, specify the presence of stated features, regions, integers, steps, operations, elements, and/or components, but do not preclude the presence or addition of one or more other features, regions, integers, steps, operations, elements, components, and/or groups thereof.

Furthermore, relative terms, such as "lower" or "bottom" and "upper" or "top," may be used herein to describe one element's relationship to another element as illustrated in the Figures. It will be understood that relative terms are intended to encompass different orientations of the device in addition to the orientation depicted in the Figures. For example, if the device in one of the figures is turned over, elements described as being on the "lower" side of other elements would then be oriented on "upper" sides of the other elements. The term "lower," can therefore, encompasses both an orientation of "lower" and "upper," depending on the particular orientation of the figure. Similarly, if the device in one of the figures is turned over, elements described as "below" or "beneath" other elements would then be oriented "above" the other elements. The terms "below" or "beneath" can, therefore, encompass both an orientation of above and below.

Unless otherwise defined, all terms (including technical and scientific terms) used herein have the same meaning as commonly understood by one of ordinary skill in the art to which this disclosure belongs. It will be further understood that terms, such as those defined in commonly used dictionaries, should be interpreted as having a meaning that is consistent with their meaning in the context of the relevant art and the present disclosure, and will not be interpreted in an idealized or overly formal sense unless expressly so defined herein.

Hereinafter, embodiments of the invention will be described in detail with reference to the accompanying drawings.

FIG. 1 is a block diagram illustrating a display apparatus according to an embodiment of the invention.

Referring to FIG. 1, an embodiment of the display apparatus includes a display panel 100 and a display panel driver. The display panel driver includes a driving controller 200, a gate emission driver 300, a gamma reference voltage generator 400 and a data driver 500.

The display panel 100 has a display region on which an image is displayed and a peripheral region adjacent to the display region. No image may be displayed on the peripheral region.

The display panel 100 includes a plurality of gate lines GWL, GCL, GIL and GBL, a plurality of emission lines EML, a plurality of data lines DL and a plurality of pixels electrically connected to the gate lines GWL, GCL, GIL and GBL, the emission lines EML and the data lines DL. The gate lines GWL, GCL, GIL and GBL may each extend in a first direction D1, the emission lines EML may each extend in the first direction D1 and the data lines DL may each extend in a second direction D2 crossing the first direction D1.

The driving controller 200 receives input image data IMG and an input control signal CONT from an external apparatus. In an embodiment, for example, the input image data IMG may include red image data, green image data and blue image data. The input image data IMG may include white image data. In another embodiment, for example, the input image data IMG may include magenta image data, cyan image data and yellow image data. The input control signal CONT may include a master clock signal and a data enable signal. The input control signal CONT may further include a vertical synchronizing signal and a horizontal synchronizing signal.

The driving controller 200 generates a first control signal CONT1, a second control signal CONT2, a third control signal CONT3 and a data signal DATA based on the input image data IMG and the input control signal CONT.

The driving controller 200 generates the first control signal CONT1 for controlling an operation of the gate emission driver 300 based on the input control signal CONT, and outputs the first control signal CONT1 to the gate emission driver 300. The first control signal CONT1 may include a vertical start signal and a gate clock signal.

The driving controller 200 generates the second control signal CONT2 for controlling an operation of the data driver 500 based on the input control signal CONT, and outputs the second control signal CONT2 to the data driver 500. The second control signal CONT2 may include a horizontal start signal and a load signal.

The driving controller 200 generates the data signal DATA based on the input image data IMG. The driving controller 200 outputs the data signal DATA to the data driver 500.

The driving controller 200 generates the third control signal CONT3 for controlling an operation of the gamma reference voltage generator 400 based on the input control signal CONT, and outputs the third control signal CONT3 to the gamma reference voltage generator 400.

The gate emission driver 300 generates gate signals for driving the gate lines GWL, GCL, GIL and GBL in response to the first control signal CONT1 received from the driving controller 200. The gate emission driver 300 may output the gate signals to the gate lines GWL, GCL, GIL and GBL. The gate emission driver 300 may also generate emission signals for driving the emission lines EML in response to the first control signal CONT1 received from the driving controller 200. The gate emission driver 300 may output the emission signals to the emission lines EML.

The gamma reference voltage generator 400 generates a gamma reference voltage VGREF in response to the third control signal CONT3 received from the driving controller 200. The gamma reference voltage generator 400 provides the gamma reference voltage VGREF to the data driver 500. The gamma reference voltage VGREF has a value corresponding to a level of the data signal DATA.

In an embodiment, the gamma reference voltage generator 400 may be disposed or integrated in the driving controller 200, or in the data driver 500.

The data driver 500 receives the second control signal CONT2 and the data signal DATA from the driving controller 200, and receives the gamma reference voltages VGREF from the gamma reference voltage generator 400. The data driver 500 converts the data signal DATA into data voltages having an analog type using the gamma reference voltages VGREF. The data driver 500 outputs the data voltages to the data lines DL.

Figure 2:
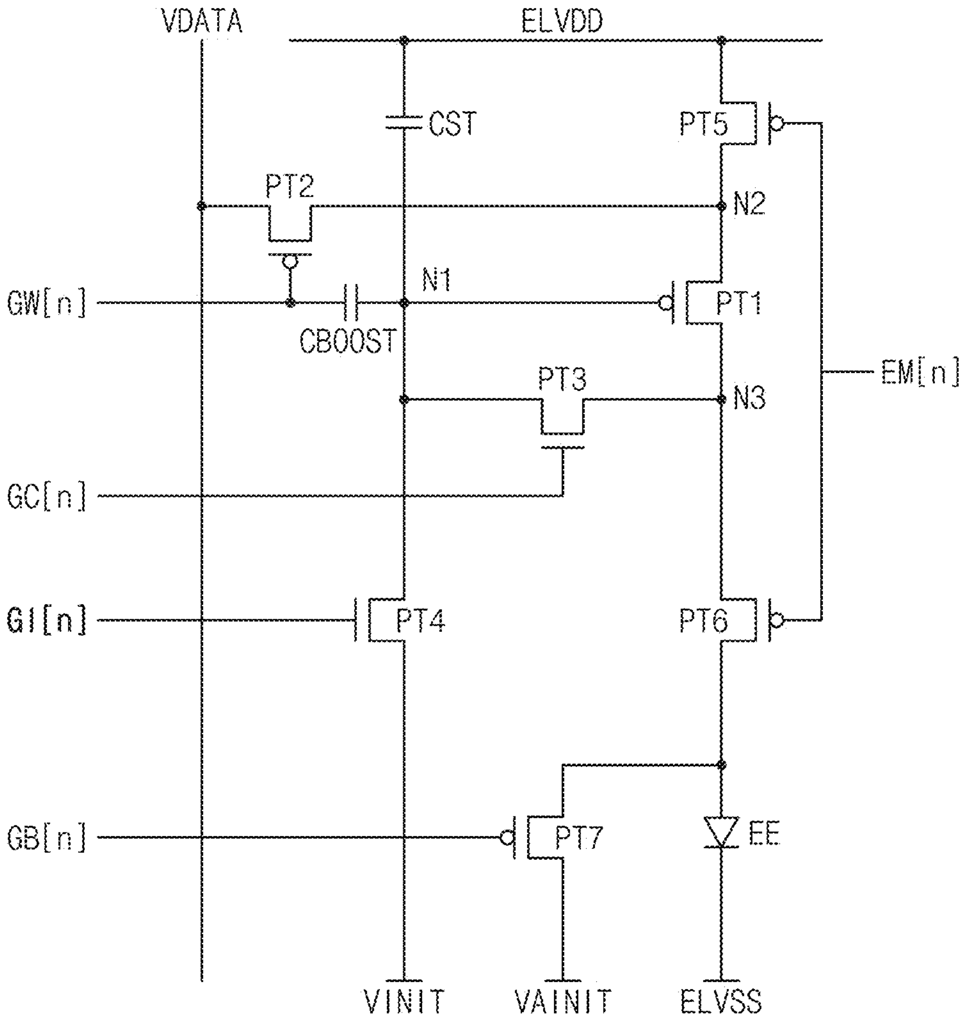
FIG. 2 is a circuit diagram illustrating an example of a pixel of the display panel of FIG. 1.

FIG. 2 is a circuit diagram illustrating an example of a pixel of the display panel 100 of FIG. 1.

Referring to FIGS. 1 and 2, in an embodiment, the display panel 100 includes a plurality of pixels. Each of the pixels includes a light emitting element EE.

In an embodiment, a pixel receives a data writing gate signal GW[n], a compensation gate signal GC[n], a data initialization gate signal GI[n], a light emitting element initialization gate signal GB[n], an emission signal EM[n] and a data voltage VDATA and the light emitting element EE of the pixel emits light corresponding to the level of the data voltage VDATA to display the image.

In an embodiment, the pixel may include a switching element of a first type and a switching element of a second type different from the first type. In an embodiment, for example, the switching element of the first type may be a polysilicon thin film transistor. In an embodiment, for example, the switching element of the first type may be a low temperature polysilicon (LTPS) thin film transistor. In an embodiment, for example, the switching element of the second type may be an oxide semiconductor thin film transistor. In an embodiment, for example, the switching element of the first type may be a P-type transistor and the switching element of the second type may be an N-type transistor. Although some of the pixel switching elements may be the oxide semiconductor thin film transistors and other pixel switching elements may be the polysilicon thin film transistors in an embodiment, the invention may not be limited thereto. Embodiments of the invention may include a case where the pixel includes including only the oxide semiconductor thin film transistors. Although some of the pixel switching elements may be the N-type transistors and other pixel switching elements may be the P-type transistors in an embodiment, the invention may not be limited thereto. Embodiments of the invention may include a case where the pixel includes including only the N-type transistors.

In an embodiment, a pixel of the pixels may include first to seventh pixel switching elements PT1 to PT7 and the light emitting element EE.

The first pixel switching element PT1 may include a control electrode connected to a first pixel node N1, a first electrode connected to a second pixel node N2 and a second electrode connected to a third pixel node N3. The second pixel switching element PT2 may include a control electrode that receives the data writing gate signal GW[n], a first electrode that receives the data voltage VDATA and a second electrode connected to the second pixel node N2. The third pixel switching element PT3 may include a control electrode that receives the compensation gate signal GC[n], a first electrode connected to the first pixel node N1 and a second electrode connected to the third pixel node N3. The fourth pixel switching element PT4 may include a control electrode that receives the data initialization gate signal GI[n], a first electrode that receives an initialization voltage VINIT and a second electrode connected to the first pixel node N1. The fifth pixel switching element PT5 may include a control electrode that receives the emission signal EM[n], a first electrode that receives a pixel high power voltage ELVDD and a second electrode connected to the second pixel node N2. The sixth pixel switching element PT6 may include a control electrode that receives the emission signal EM[n], a first electrode connected to the third pixel node N3 and a second electrode connected to an anode electrode of the light emitting element EE. The seventh pixel switching element PT7 may include a control electrode that receives the light emitting element initialization gate signal GB[n], a first electrode that receives a light emitting element initialization voltage VAINIT and a second electrode connected to the anode electrode of the light emitting element EE. The light emitting element EE may include the anode electrode and a cathode electrode that receives a pixel low power voltage ELVSS.

In an embodiment, the pixel may further include a storage capacitor CST including a first electrode that receives the pixel high power voltage ELVDD and a second electrode connected to the first pixel node N1, and a boosting capacitor CBOOST including a first electrode that receives the data writing gate signal GW[n] and a second electrode connected to the first pixel node N1.

In an embodiment, the signal outputted from a gate signal masking circuit of the gate emission driver 300 may be the compensation gate signal GC[n]. Alternatively, the signal outputted from the gate signal masking circuit of the gate emission driver 300 may be the data initialization gate signal GI[n].

A driving current may flow through the fifth pixel switching element PT5, the first pixel switching element PT1 and the sixth pixel switching element PT6 to drive the light emitting element EE. An intensity of the driving current may be determined by the level of the data voltage VDATA. A luminance of the light emitting element EE may be determined by the intensity of the driving current.

In an embodiment, when the image to be displayed on the display panel 100 is a static image or the display panel is operated in an always-on mode, a driving frequency of the display panel 100 may be decreased to reduce a power consumption. In a case where all of the switching elements of the pixel of the display panel 100 are polysilicon thin film transistor, a flicker may occur due to a leakage current of the pixel switching element in the low frequency driving mode. Thus, in an embodiment, some of the pixel switching elements may be designed using the oxide semiconductor thin film transistors. In an embodiment, the third pixel switching element PT3 and the fourth pixel switching element PT4 may be the oxide semiconductor thin film transistors. In such an embodiment, the first pixel switching element PT1, the second pixel switching element PT2, the fifth pixel switching element PT5, the sixth pixel switching element PT6 and the seventh pixel switching element PT7 may be the polysilicon thin film transistors.

Figure 3:
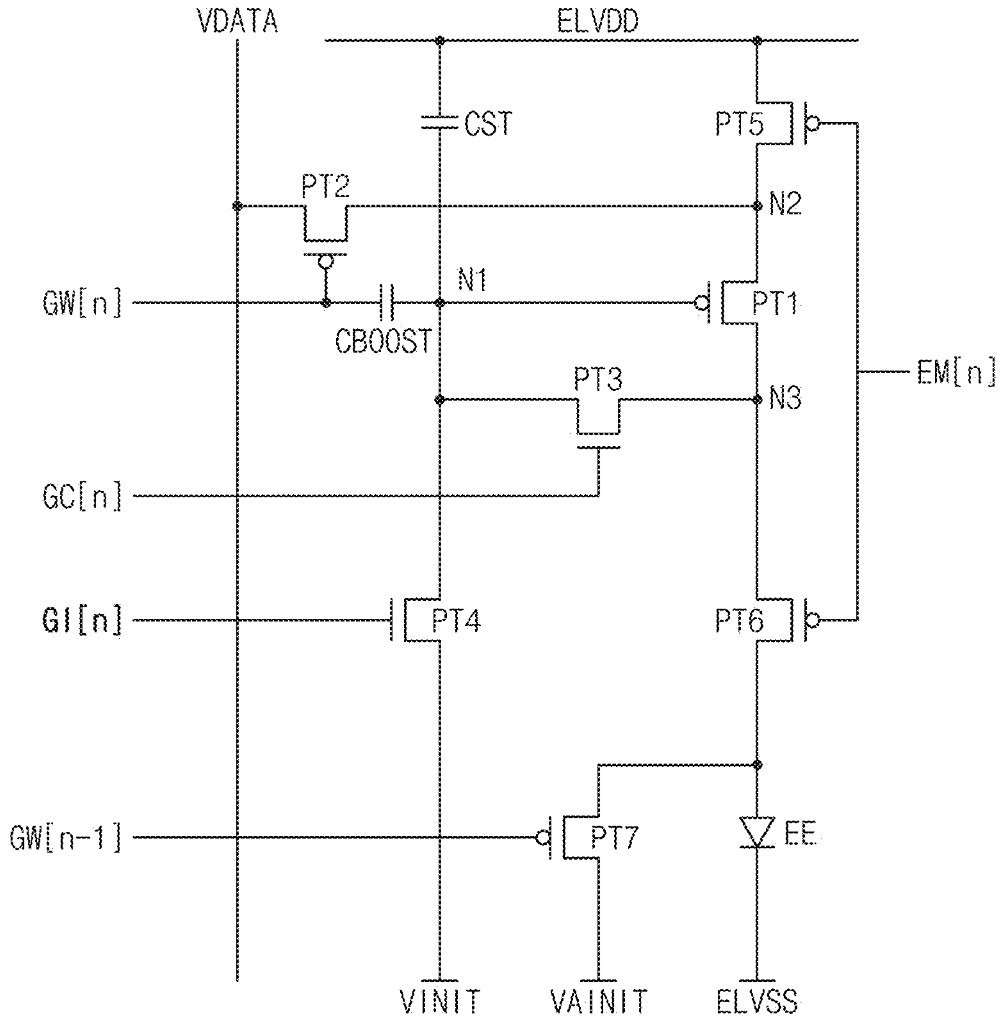
FIG. 3 is a circuit diagram illustrating an example of a pixel of the display panel of FIG. 1.

FIG. 3 is a circuit diagram illustrating an example of a pixel of the display panel of FIG. 1.

Referring to FIGS. 1 and 3, in an embodiment, the display panel 100 includes a plurality of pixels. Each of the pixels includes a light emitting element EE.

In such an embodiment, a pixel receives a data writing gate signal GW[n], a compensation gate signal GC[n], a data initialization gate signal GI[n], a light emitting element initialization gate signal GB[n], the emission signal EM[n] and the data voltage VDATA and the light emitting element EE of the pixel emits light corresponding to the level of the data voltage VDATA to display the image.

In an embodiment, the pixel may include a switching element of a first type and a switching element of a second type different from the first type. In an embodiment, for example, the switching element of the first type may be a polysilicon thin film transistor. In an embodiment, for example, the switching element of the first type may be a low temperature polysilicon (LTPS) thin film transistor. In an embodiment, for example, the switching element of the second type may be an oxide semiconductor thin film transistor. In an embodiment, for example, the switching element of the first type may be a P-type transistor and the switching element of the second type may be an N-type transistor. Although some of the pixel switching elements may be the oxide semiconductor thin film transistors and other pixel switching elements may be the polysilicon thin film transistors in an embodiment, the invention may not be limited thereto. Embodiments of the invention may include a case where the pixel includes including only the oxide semiconductor thin film transistors. Although some of the pixel switching elements may be the N-type transistors and other pixel switching elements may be the P-type transistors in an embodiment, the invention may not be limited thereto. Embodiments of the invention may include a case where the pixel includes including only the N-type transistors.

In an embodiment, a pixel of the pixels may include first to seventh pixel switching elements PT1 to PT7 and the light emitting element EE.

The first pixel switching element PT1 may include a control electrode connected to a first pixel node N1, a first electrode connected to a second pixel node N2 and a second electrode connected to a third pixel node N3. The second pixel switching element PT2 may include a control electrode that receives the data writing gate signal GW[n], a first electrode that receives the data voltage VDATA and a second electrode connected to the second pixel node N2. The third pixel switching element PT3 may include a control electrode that receives the compensation gate signal GC[n], a first electrode connected to the first pixel node N1 and a second electrode connected to the third pixel node N3. The fourth pixel switching element PT4 may include a control electrode that receives the data initialization gate signal GI[n], a first electrode that receives an initialization voltage VINIT and a second electrode connected to the first pixel node N1. The fifth pixel switching element PT5 may include a control electrode that receives the emission signal EM[n], a first electrode that receives a pixel high power voltage ELVDD and a second electrode connected to the second pixel node N2. The sixth pixel switching element PT6 may include a control electrode that receives the emission signal EM[n], a first electrode connected to the third pixel node N3 and a second electrode connected to an anode electrode of the light emitting element EE. The seventh pixel switching element PT7 may include a control electrode that receives a data writing gate signal GW[n−1] of a previous stage as the light emitting element initialization gate signal GB[n], a first electrode that receives a light emitting element initialization voltage VAINIT and a second electrode connected to the anode electrode of the light emitting element EE. The light emitting element EE may include the anode electrode and a cathode electrode that receives a pixel low power voltage ELVSS.

The pixel may further include a storage capacitor CST including a first electrode that receives the pixel high power voltage ELVDD and a second electrode connected to the first pixel node N1 and a boosting capacitor CBOOST including a first electrode that receives the data writing gate signal GW[n] and a second electrode connected to the first pixel node N1.

In an embodiment, the signal outputted from a gate signal masking circuit of the gate emission driver 300 may be the compensation gate signal GC[n]. Alternatively, the signal outputted from the gate signal masking circuit of the gate emission driver 300 may be the data initialization gate signal GI[n].

In an embodiment, the light emitting element initialization gate signal GB[n] may be the data writing gate signal GW[n−1] of the previous stage. In such an embodiment where the data writing gate signal GW[n−1] of the previous stage is used as the light emitting element initialization gate signal GB[n] of the present stage, a part of the gate signal generating circuit of the gate emission driver 300 may be omitted. Thus, the manufacturing cost of the display apparatus may be reduced and the dead space of the display apparatus may be reduced.

In an embodiment, when the image to be displayed on the display panel 100 is a static image or the display panel is operated in an always-on mode, a driving frequency of the display panel 100 may be decreased to reduce a power consumption. In a case where all of the switching elements of the pixel of the display panel 100 are polysilicon thin film transistor, a flicker may occur due to a leakage current of the pixel switching element in the low frequency driving mode. Thus, in an embodiment, some of the pixel switching elements may be designed using the oxide semiconductor thin film transistors. In an embodiment, the third pixel switching element PT3 and the fourth pixel switching element PT4 may be the oxide semiconductor thin film transistors, and the first pixel switching element PT1, the second pixel switching element PT2, the fifth pixel switching element PT5, the sixth pixel switching element PT6 and the seventh pixel switching element PT7 may be the polysilicon thin film transistors.

Figure 4:
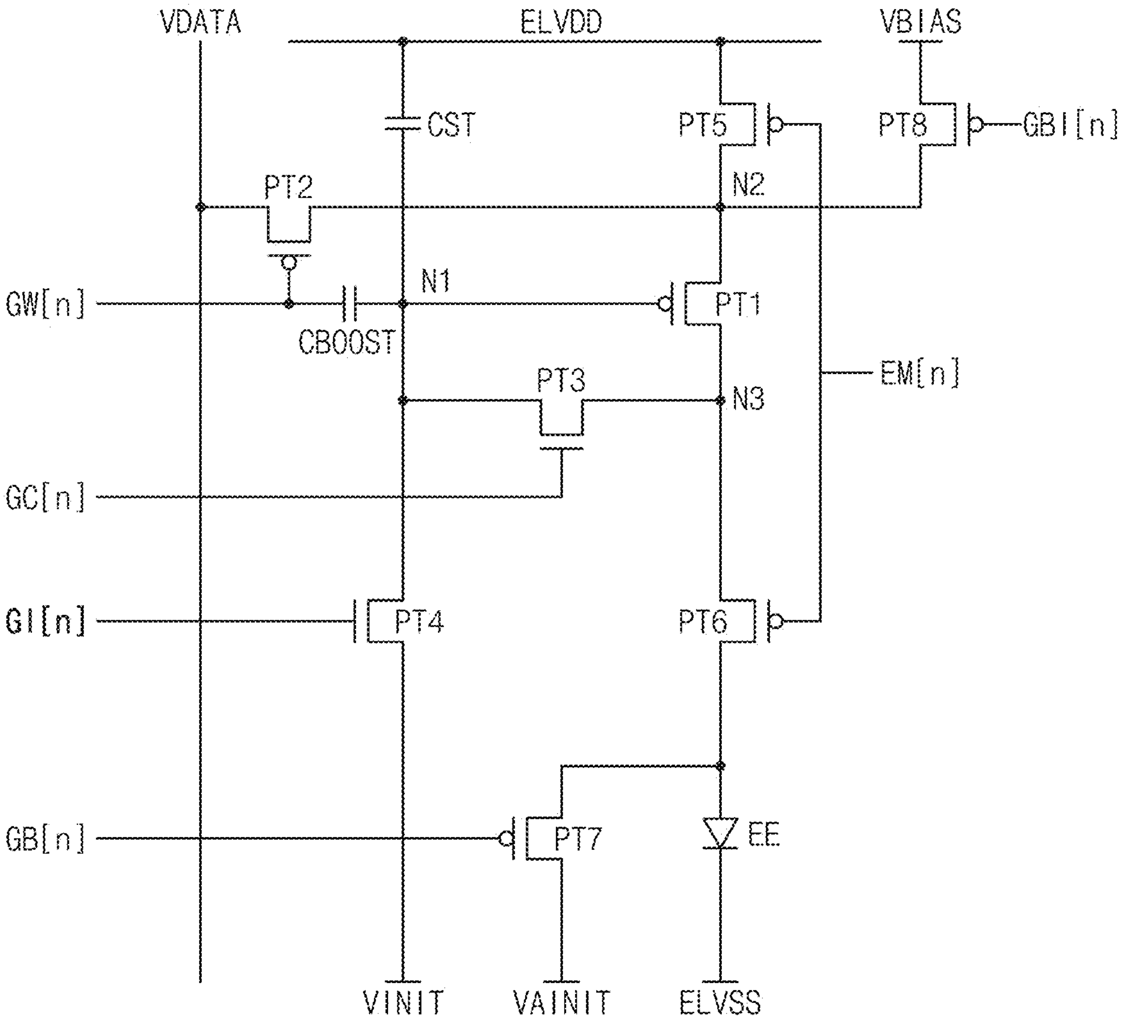
FIG. 4 is a circuit diagram illustrating an example of a pixel of the display panel of FIG. 1.

FIG. 4 is a circuit diagram illustrating an example of a pixel of the display panel of FIG. 1.

Referring to FIGS. 1 and 4, in an embodiment, the display panel 100 includes a plurality of pixels. Each of the pixels includes a light emitting element EE.

In an embodiment, a pixel receives a data writing gate signal GW[n], a compensation gate signal GC[n], a data initialization gate signal GI[n], a light emitting element initialization gate signal GB[n], a bias gate signal GBI[n], the emission signal EM[n] and the data voltage VDATA and the light emitting element EE of the pixel emits light corresponding to the level of the data voltage VDATA to display the image.

In the embodiment, the pixel may include a switching element of a first type and a switching element of a second type different from the first type. In an embodiment, for example, the switching element of the first type may be a polysilicon thin film transistor. In an embodiment, for example, the switching element of the first type may be a low temperature polysilicon (LTPS) thin film transistor. In an embodiment, for example, the switching element of the second type may be an oxide semiconductor thin film transistor. In an embodiment, for example, the switching element of the first type may be a P-type transistor and the switching element of the second type may be an N-type transistor. Although some of the pixel switching elements may be the oxide semiconductor thin film transistors and other pixel switching elements may be the polysilicon thin film transistors in an embodiment, the invention may not be limited thereto. Embodiments of the invention may include a case where the pixel includes including only the oxide semiconductor thin film transistors. Although some of the pixel switching elements may be the N-type transistors and other pixel switching elements may be the P-type transistors in the embodiment, the invention may not be limited thereto. Embodiments of the invention may include a case where the pixel includes only the N-type transistors.

In an embodiment a pixel of the pixels may include first to eighth pixel switching elements PT1 to PT8 and the light emitting element EE.

The first pixel switching element PT1 may include a control electrode connected to a first pixel node N1, a first electrode connected to a second pixel node N2 and a second electrode connected to a third pixel node N3. The second pixel switching element PT2 may include a control electrode that receives the data writing gate signal GW[n], a first electrode that receives the data voltage VDATA and a second electrode connected to the second pixel node N2. The third pixel switching element PT3 may include a control electrode that receives the compensation gate signal GC[n], a first electrode connected to the first pixel node N1 and a second electrode connected to the third pixel node N3. The fourth pixel switching element PT4 may include a control electrode that receives the data initialization gate signal GI[n], a first electrode that receives an initialization voltage VINIT and a second electrode connected to the first pixel node N1. The fifth pixel switching element PT5 may include a control electrode that receives the emission signal EM[n], a first electrode that receives a pixel high power voltage ELVDD and a second electrode connected to the second pixel node N2. The sixth pixel switching element PT6 may include a control electrode that receives the emission signal EM[n], a first electrode connected to the third pixel node N3 and a second electrode connected to an anode electrode of the light emitting element EE. The seventh pixel switching element PT7 may include a control electrode that receives the light emitting element initialization gate signal GB[n], a first electrode that receives a light emitting element initialization voltage VAINIT and a second electrode connected to the anode electrode of the light emitting element EE. The eighth pixel switching element PT8 may include a control electrode that receives the bias gate signal GBI[n], a first electrode that receives a bias voltage VBIAS and a second electrode connected to the second pixel node N2. The light emitting element EE may include the anode electrode and a cathode electrode that receives a pixel low power voltage ELVSS.

In an embodiment, the pixel may further include a storage capacitor CST including a first electrode that receives the pixel high power voltage ELVDD and a second electrode connected to the first pixel node N1 and a boosting capacitor CBOOST including a first electrode that receives the data writing gate signal GW[n] and a second electrode connected to the first pixel node N1.

In an embodiment, the signal outputted from a gate signal masking circuit of the gate emission driver 300 may be the compensation gate signal GC[n]. Alternatively, the signal outputted from the gate signal masking circuit of the gate emission driver 300 may be the data initialization gate signal GI[n].

In an embodiment, when the image to be displayed on the display panel 100 is a static image or the display panel is operated in an always-on mode, a driving frequency of the display panel 100 may be decreased to reduce a power consumption. In a case where all of the switching elements of the pixel of the display panel 100 are polysilicon thin film transistor, a flicker may occur due to a leakage current of the pixel switching element in the low frequency driving mode.

Thus, in an embodiment, some of the pixel switching elements may be designed using the oxide semiconductor thin film transistors. In an embodiment, the third pixel switching element PT3 and the fourth pixel switching element PT4 may be the oxide semiconductor thin film transistors, and the first pixel switching element PT1, the second pixel switching element PT2, the fifth pixel switching element PT5, the sixth pixel switching element PT6, the seventh pixel switching element PT7 and the eighth pixel switching element PT8 may be the polysilicon thin film transistors.

Figure 5:
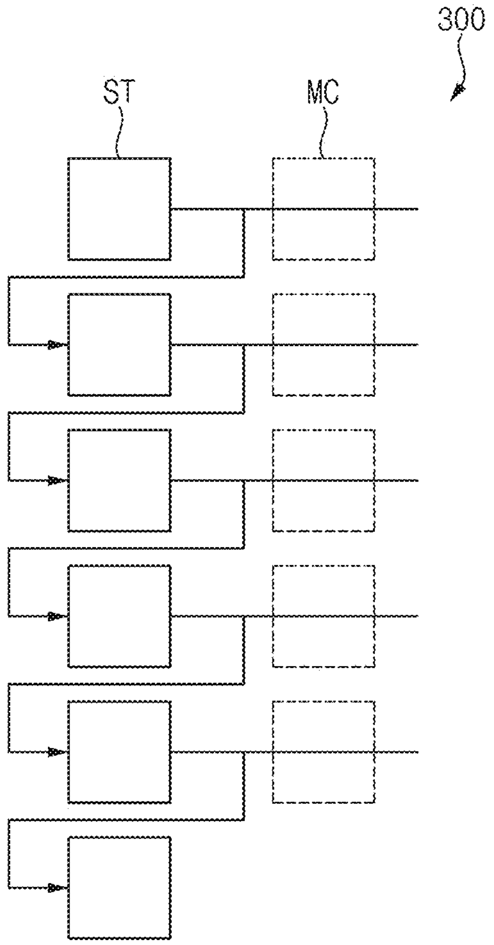
FIG. 5 is a conceptual diagram illustrating a gate emission driver of FIG. 1.
Figure 6:
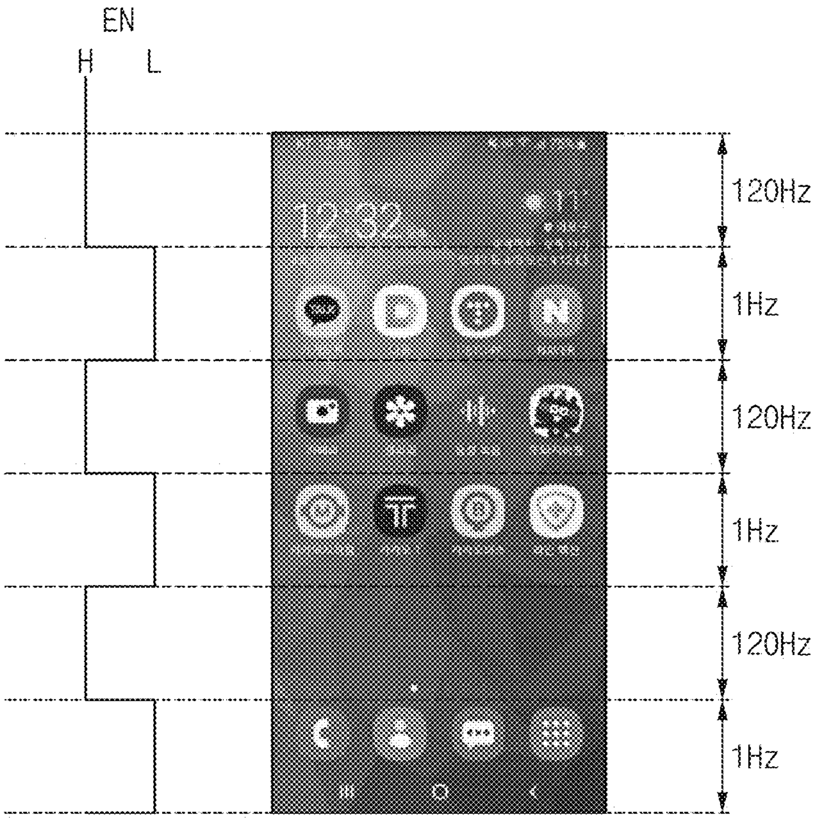
FIG. 6 is a conceptual diagram illustrating an enable signal applied to the gate emission driver of FIG. 1 according to driving frequencies of portions of the display panel of FIG. 1.

FIG. 5 is a conceptual diagram illustrating the gate emission driver 300 of FIG. 1. FIG. 6 is a conceptual diagram illustrating an enable signal EN applied to the gate emission driver 300 of FIG. 1 according to driving frequencies of portions of the display panel 100 of FIG. 1.

Referring to FIGS. 1 to 6, in an embodiment, the gate emission driver 300 may include a carry generator (or a stage) ST that generates a carry signal based on a previous carry signal and a gate signal masking circuit MC connected to the carry generator ST.

The gate signal masking circuit MC may output or not output a gate pulse based on the enable signal EN. In an embodiment, for example, the gate signal masking circuit MC may control the output of the gate signal based on the enable signal EN, a signal of a first input node connected to a first driver, a signal of a second input node connected to a second driver and a signal of a third input node connected to the second driver.

In an embodiment, for example, when the enable signal EN has a high level H, the gate signal masking circuit MC may output the gate pulse.

In an embodiment, for example, when the enable signal EN has a low level L, the gate signal masking circuit MC may not output the gate pulse.

In an embodiment, as shown in FIG. 6, the gate emission driver 300 may output the gate pulse at a high frequency (e.g., 120 Hz) for a portion of the display panel 100 where a high frequency driving is desired, and may output a gate pulse at a low frequency (e.g., 1 Hz) for a portion of the display panel 100 where a low frequency driving is desired based on the enable signal EN.

The gate signal masking circuit MC may mask an output of the gate pulse to output the gate pulse in the low frequency (e.g., 1 Hz). The carry generator ST transfers the carry signal to a next stage regardless of the operation of the gate signal masking circuit MC that masks the output of the gate pulse such that the gate emission driver 300 may support the multiple division of the driving frequency.

Figure 7:
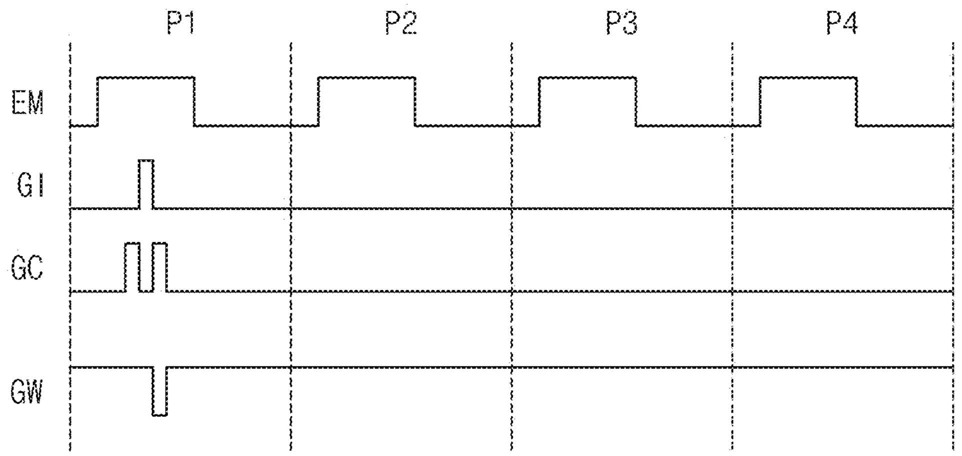
FIG. 7 is a signal timing diagram illustrating input signals applied to the pixel of FIG. 2 in a data writing period.
Figure 8:
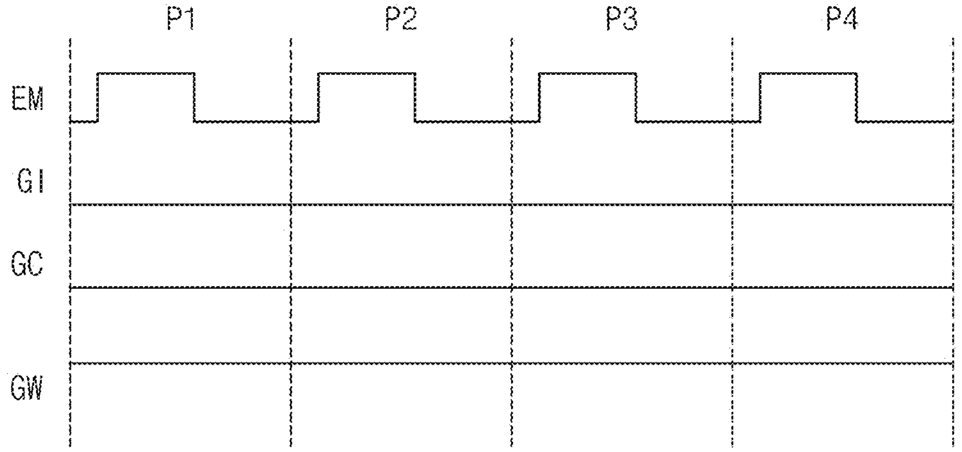
FIG. 8 is a signal timing diagram illustrating input signals applied to the pixel of FIG. 2 in a self scan period.

FIG. 7 is a signal timing diagram illustrating input signals applied to the pixel of FIG. 2 in a data writing period. FIG. 8 is a signal timing diagram illustrating input signals applied to the pixel of FIG. 2 in a self scan period.

Referring to FIGS. 1 to 8, in a low frequency driving mode, a driving timing of the display panel 100 includes a data writing period, in which the data voltage is written to the pixel and the pixel emits a light, and a self scan period, in which the data voltage is not written to the pixel and the pixel emits a light.

In a first frame P1 of FIG. 7, which is the data writing period, the data initialization gate signal GI, the compensation gate signal GC and the data writing gate signal GW may have active pulses. Second to fourth frames P2 to P4 of FIG. 7 may be the self scan periods.

As shown in the first frame P1 of FIG. 7, the data initialization gate signal GI may output a single pulse in the frame. As shown in the first frame P1 of FIG. 7, the compensation gate signal GC may output two pulses in the frame.

In contrast, in a first frame P1 of FIG. 8, which is the self scan period, the data initialization gate signal GI, the compensation gate signal GC and the data writing gate signal GW may not have any active pulses. Second to fourth frames P2 to P4 of FIG. 8 may be the self scan periods.

Figure 9:
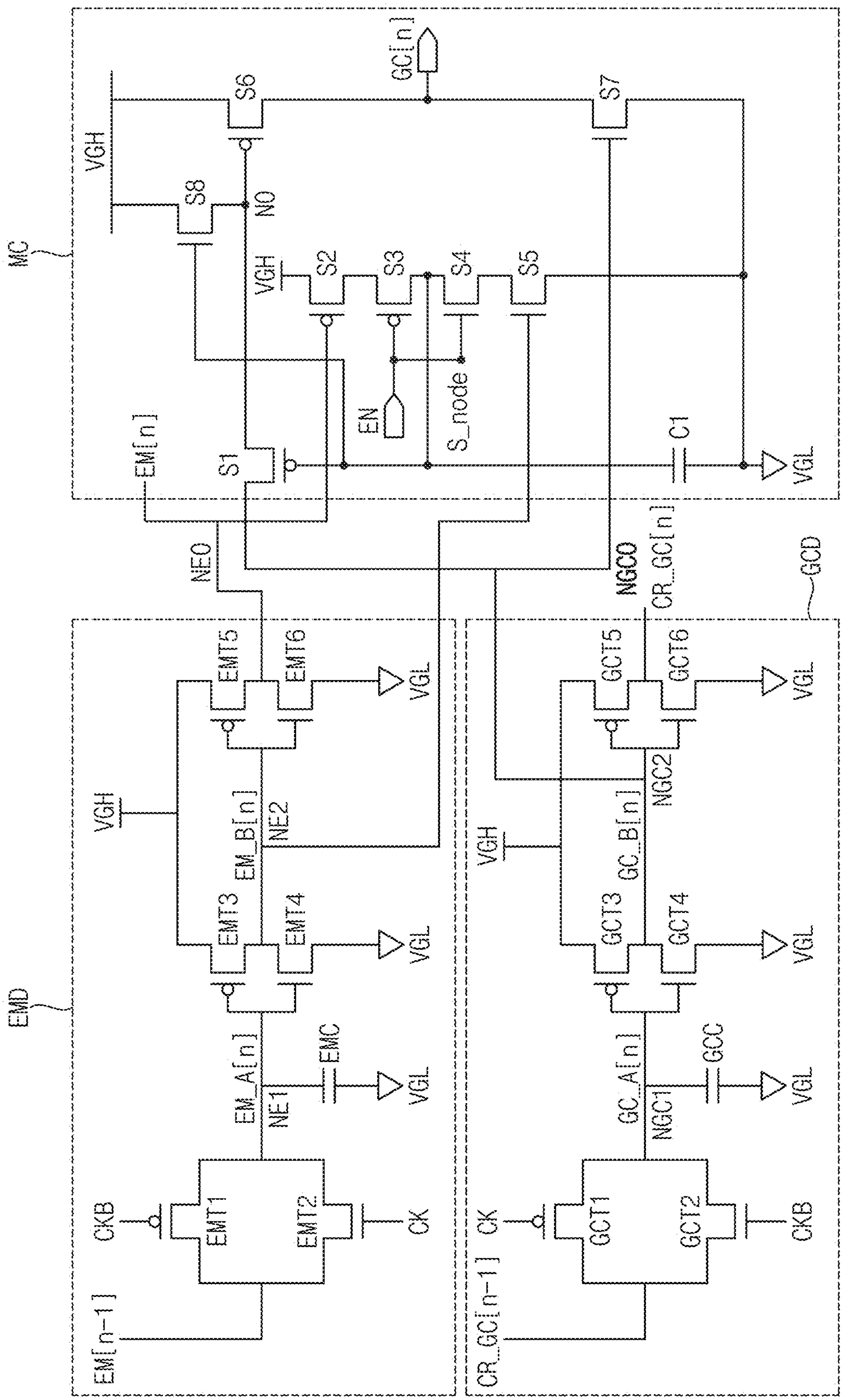
FIG. 9 is a circuit diagram illustrating a first driver, a second driver and a gate signal masking circuit of the gate emission driver of FIG. 1.
Figure 10:
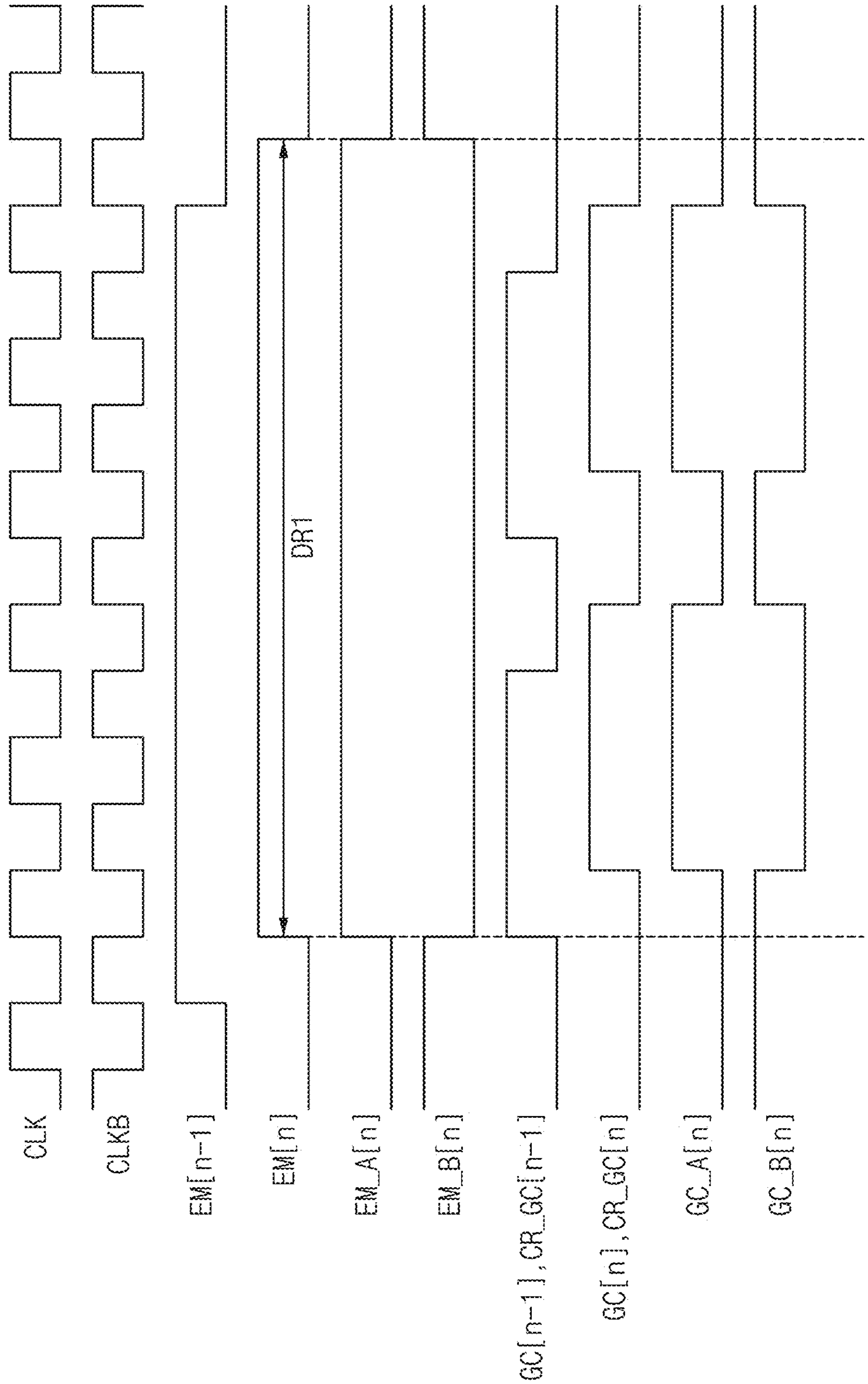
FIG. 10 is a signal timing diagram illustrating input signals, node signals and output signals of the first driver, the second driver and the gate signal masking circuit of FIG. 9.

FIG. 9 is a circuit diagram illustrating a first driver GCD, a second driver EMD and a gate signal masking circuit MC of the gate emission driver 300 of FIG. 1. FIG. 10 is a signal timing diagram illustrating input signals, node signals and output signals of the first driver GCD, the second driver EMD and the gate signal masking circuit MC of FIG. 9.

Referring to FIGS. 1 to 10, in an embodiment, the first driver GCD may be a carry generator that generates a carry signal of the compensation gate signal GC. The first driver GCD may be a complementary metal-oxide semiconductor (CMOS) driver. The first driver GCD may generate a carry signal CR_GC[n] based on a previous carry signal CR_GC[n−1].

The first driver GCD may include a first gate switching element GCT1, a second gate switching element GCT2, a third gate switching element GCT3, a fourth gate switching element GCT4, a fifth gate switching element GCT5 and a sixth gate switching element GCT6.

The first gate switching element GCT1 may include a control electrode that receives one of a first clock signal CK and a second clock signal CKB, a first electrode that receives the previous carry signal CR_GC[n−1] and a second electrode connected to a first gate node NGC1.

The second gate switching element GCT2 may include a control electrode that receives the other of the first clock signal CK and the second clock signal CKB, a first electrode that receives the previous carry signal CR_GC[n−1] and a second electrode connected to the first gate node NGC1. The third gate switching element GCT3 may include a control electrode connected to the first gate node NGC1, a first electrode that receives a first power voltage VGH and a second electrode connected to a second gate node NGC2. The fourth gate switching element GCT4 may include a control electrode connected to the first gate node NGC1, a first electrode connected to the second gate node NGC2 and a second electrode that receives a second power voltage VGL. The fifth gate switching element GCT5 may include a control electrode connected to the second gate node NGC2, a first electrode that receives the first power voltage VGH and a second electrode connected to a carry output node NGCO. The sixth gate switching element GCT6 may include a control electrode connected to the second gate node NGC2, a first electrode connected to the carry output node NGCO and a second electrode that receives the second power voltage VGL.

In an embodiment, the first power voltage VGH and the second power voltage VGL may be power voltages of the gate emission driver 300. In an embodiment, for example, the first power voltage VGH may be greater than the second power voltage VGL.

When the first clock signal CK is applied to the control electrode of the first gate switching element GCT1, the second clock signal CKB may be applied to the control electrode of the second gate switching element GCT2. In contrast, when the second clock signal CKB is applied to the control electrode of the first gate switching element GCT1, the first clock signal CK may be applied to the control electrode of the second gate switching element GCT2.

The first driver GCD may further include a gate capacitor GCC including a first electrode connected to the first gate node NGC1 and a second electrode that receives the second power voltage VGL.

The first gate switching element GCT1, the third gate switching element GCT3 and the fifth gate switching element GCT5 may be P-type transistors. The second gate switching element GCT2, the fourth gate switching element GCT4 and the sixth gate switching element GCT6 may be N-type transistors.

The first gate switching element GCT1 and the second gate switching element GCT2 may be synchronized with the first clock signal CK and the second clock signal CKB and may transmit the previous carry signal CR_GC[n−1] to the first gate node NGC1.

The third gate switching element GCT3 and the fourth gate switching element GCT4 may invert the signal GC_A[n] of the first gate node NGC1 and may transmit the inverted signal to the second gate node NGC2.

The fifth gate switching element GCT5 and the sixth gate switching element GCT6 may invert the signal GC_B[n] of the second gate node NGC2 and may output the inverted signal to the carry output node NGCO.

The carry output node NGCO may output the carry signal CR_GC[n].

The second driver EMD may be an emission driver that generates the emission signal EM. The second driver EMD may be a CMOS driver. The second driver EMD may generate the emission signal EM[n] based on a previous emission signal EM[n−1].

The second driver EMD may include a first emission switching element EMT1, a second emission switching element EMT2, a third emission switching element EMT3, a fourth emission switching element EMT4, a fifth emission switching element EMT5 and a sixth emission switching element EMT6.

The first emission switching element EMT1 may include a control electrode that receives one of the first clock signal CK and the second clock signal CKB, a first electrode that receives the previous emission signal EM[n−1] and a second electrode connected to a first emission node NE1. The second emission switching element EMT2 may include a control electrode that receives the other of the first clock signal CK and the second clock signal CKB, a first electrode that receives the previous emission signal EM[n−1] and a second electrode connected to the first emission node NE1. The third emission switching element EMT3 may include a control electrode connected to the first emission node NE1, a first electrode that receives the first power voltage VGH and a second electrode connected to a second emission node NE2. The fourth emission switching element EMT4 may include a control electrode connected to the first emission node NE1, a first electrode connected to the second emission node NE2 and a second electrode that receives the second power voltage VGL. The fifth emission switching element EMT5 may include a control electrode connected to the second emission node NE2, a first electrode that receives the first power voltage VGH and a second electrode connected to an emission output node NEO. The sixth emission switching element EMT6 may include a control electrode connected to the second emission node NE2, a first electrode connected to the emission output node NEO and a second electrode that receives the second power voltage VGL.

When the first clock signal CK is applied to the control electrode of the first emission switching element EMT1, the second clock signal CKB may be applied to the control electrode of the second emission switching element EMT2. In contrast, when the second clock signal CKB is applied to the control electrode of the first emission switching element EMT1, the first clock signal CK may be applied to the control electrode of the second emission switching element EMT2.

The second driver EMD may further include an emission capacitor EMC including a first electrode connected to the first emission node NE1 and a second electrode that receives the second power voltage VGL.

The first emission switching element EMT1, the third emission switching element EMT3 and the fifth emission switching element EMT5 may be P-type transistors. The second emission switching element EMT2, the fourth emission switching element EMT4 and the sixth emission switching element EMT6 may be N-type transistors.

The first emission switching element EMT1 and the second emission switching element EMT2 may be synchronized with the first clock signal CK and the second clock signal CKB and may transmit the previous emission signal EM[n−1] to the first emission node NE1.

The third emission switching element EMT3 and the fourth emission switching element EMT4 may invert the signal EM_A[n] of the first emission node NE1 and may transmit the inverted signal to the second emission node NE2.

The fifth emission switching element EMT5 and the sixth emission switching element EMT6 may invert the signal EM_B[n] of the second emission node NE2 and may output the inverted signal to the emission output node NEO.

The emission output node NEO may output the emission signal EM[n].

The gate signal masking circuit MC may control the output of the gate signal GC[n] based on the enable signal EN, the signal GC_B[n] of a first input node connected to the second gate node NGC2 of the first driver GCD, the signal EM[n] of a second input node connected to the emission output node NEO of the second driver EMD and the signal EM_B[n] of a third input node connected to the second emission node NE2 of the second driver EMD.

In an embodiment, for example, the first input node of the gate signal masking circuit MC may be referred to as the second gate node NGC2. In an embodiment, for example, the second input node of the gate signal masking circuit MC may be referred to as the emission output node NEO. In an embodiment, for example, the third input node of the gate signal masking circuit MC may be referred to as the second emission node NE2.

The gate signal masking circuit MC may include a first switching element S1, a second switching element S2, a third switching element S3, a fourth switching element S4 and a fifth switching element S5.

The first switching element S1 may include a control electrode connected to a masking control node S_node, a first electrode connected to the first input node NGC2 and a second electrode connected to an output control node NO. The second switching element S2 may include a control electrode connected to the second input node NEO, a first electrode that receives the first power voltage VGH and a second electrode connected to a first intermediate node. The third switching element S3 may include a control electrode that receives the enable signal EN, a first electrode connected to the first intermediate node and a second electrode connected to the masking control node S_node. The fourth switching element S4 may include a control electrode that receives the enable signal EN, a first electrode connected to the masking control node S_node and a second electrode connected to a second intermediate node. The fifth switching element S5 may include a control electrode connected to the third input node NE2, a first electrode connected to the second intermediate node and a second electrode that receives the second power voltage VGL.

In an embodiment, the second switching element S2 and the third switching element S3 are P-type transistors and the fourth switching element S4 and the fifth switching element S5 are N-type transistors.

The gate signal masking circuit MC may further include a sixth switching element S6 including a control electrode connected to the output control node NO, a first electrode that receives the first power voltage VGH and a second electrode connected to a gate output node and a seventh switching element S7 including a control electrode connected to the first input node NGC2, a first electrode connected to the gate output node and a second electrode that receives the second power voltage VGL.

The gate signal masking circuit MC may further include an eighth switching element S8 including a control electrode connected to the masking control node S_node, a first electrode that receives the first power voltage VGH and a second electrode connected to the output control node NO.

In an embodiment, the first switching element may be a P-type transistor. The sixth switching element S6 may be a P-type transistor. The seventh switching element S7 may be an N-type transistor. The eighth switching element S8 may be an N-type transistor.

The gate signal masking circuit MC may further include a first capacitor C1 including a first electrode connected to the masking control node S_node and a second electrode that receives the second power voltage VGL.

The signal EM_B[n] of the third input node NE2 may be an inverted signal of the signal EM[n] of the second input node NEO.

When the signal of the masking control node S_node has a low level, the first switching element S1 is turned on such that the first input node NGC2 is connected to the output control node NO. When the signal of the masking control node S_node has the low level, the sixth switching element S6 and the seventh switching element S7 invert the signal GC_B[n] of the first input node NGC2 and output the inverted signal as the gate signal GC[n].

When the signal of the masking control node S_node has the low level, the sixth switching element S6 and the seventh switching element S7 operate similarly to the fifth gate switching element GCT5 and the sixth gate switching element GCT6 such that the gate signal GC[n] having a same waveform as the carry signal CR_GC[n] is output to the pixel.

In contrast, when the signal of the masking control node S_node has a high level, the first switching element S1 is turned off. In addition, when the signal of the masking control node S_node has the high level, the eight switching element S8 is turned on such that the first power voltage VGH having a high level is applied to the output control node NO.

When the first power voltage VGH having the high level is applied to the output control node NO, the sixth switching element S6 is turned off such that a high level of the gate signal GC[n] is not generated.

As shown in FIG. 10, the compensation gate signal GC[n] may have two high pulses in a single frame. The gate signal masking circuit MC uses signals EM[n] and EM_B[n] having a longer duration before and after the multi toggle output duration of the compensation gate signal GC[n] as the input signals such that the gate signal masking circuit MC may properly control the compensation gate signal GC[n].

Figure 12:
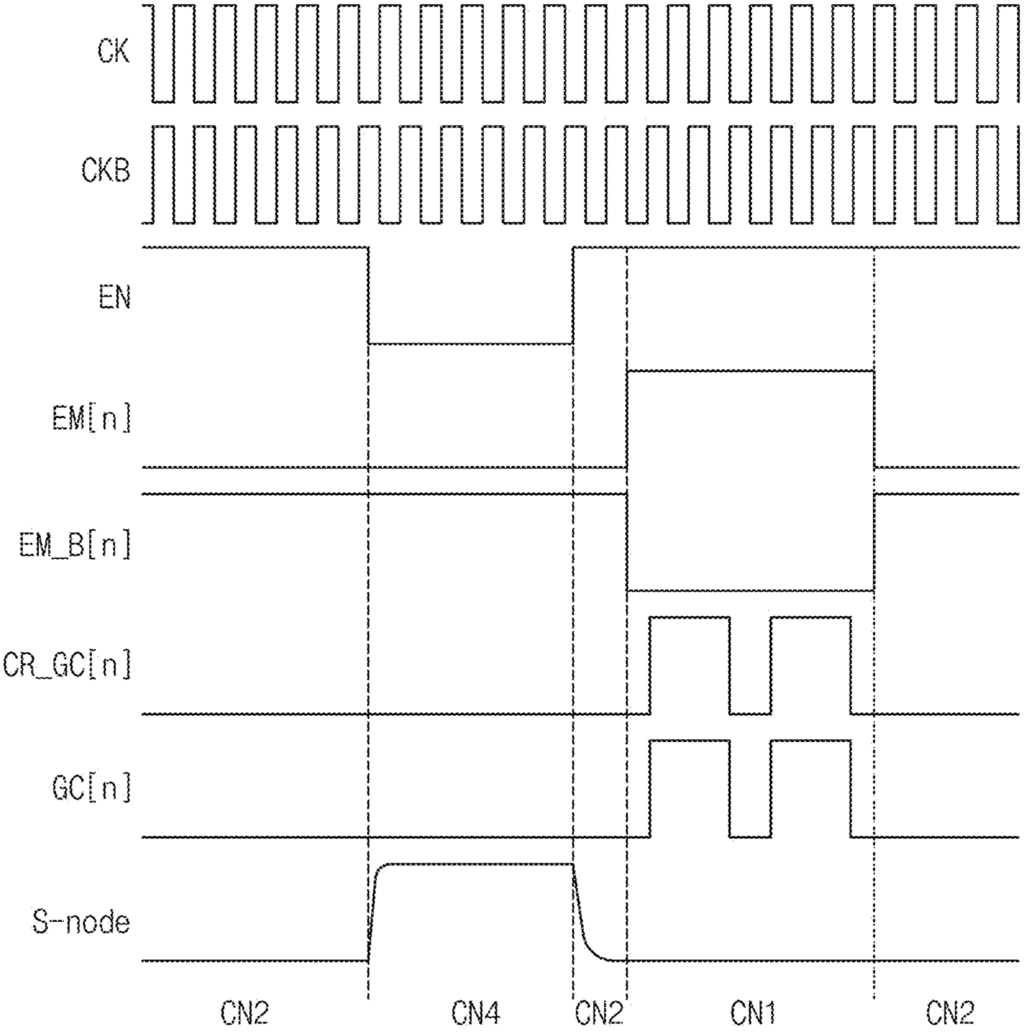
FIG. 12 is a signal timing diagram illustrating input signals, node signals and output signals of the gate signal masking circuit of FIG. 9 when a period when an emission signal maintains a high level is included in a high period of the enable signal.
Figure 13:
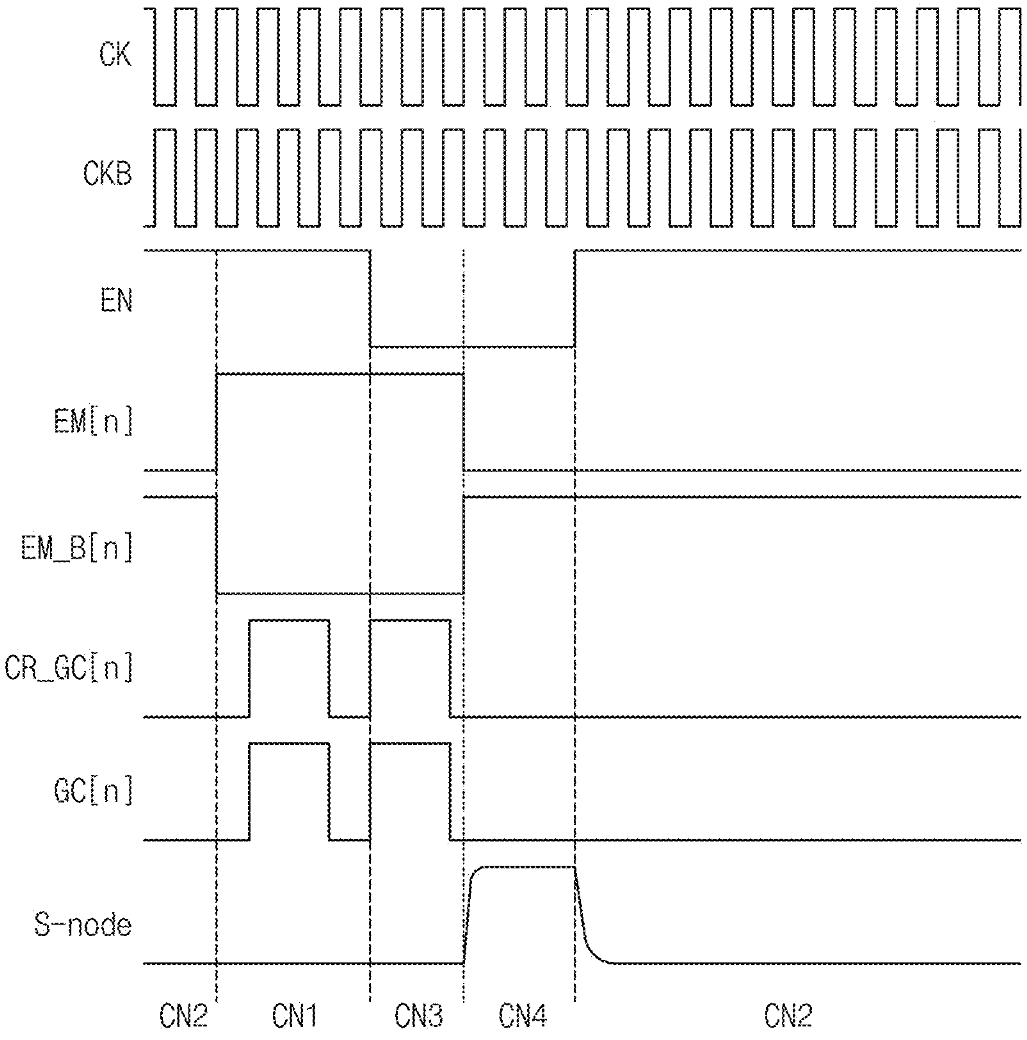
FIG. 13 is a signal timing diagram illustrating the input signals, the node signals and the output signals of the gate signal masking circuit of FIG. 9 when a time point when the emission signal is changed from a high level to a low level is included in a low period of the enable signal.
Figure 14:
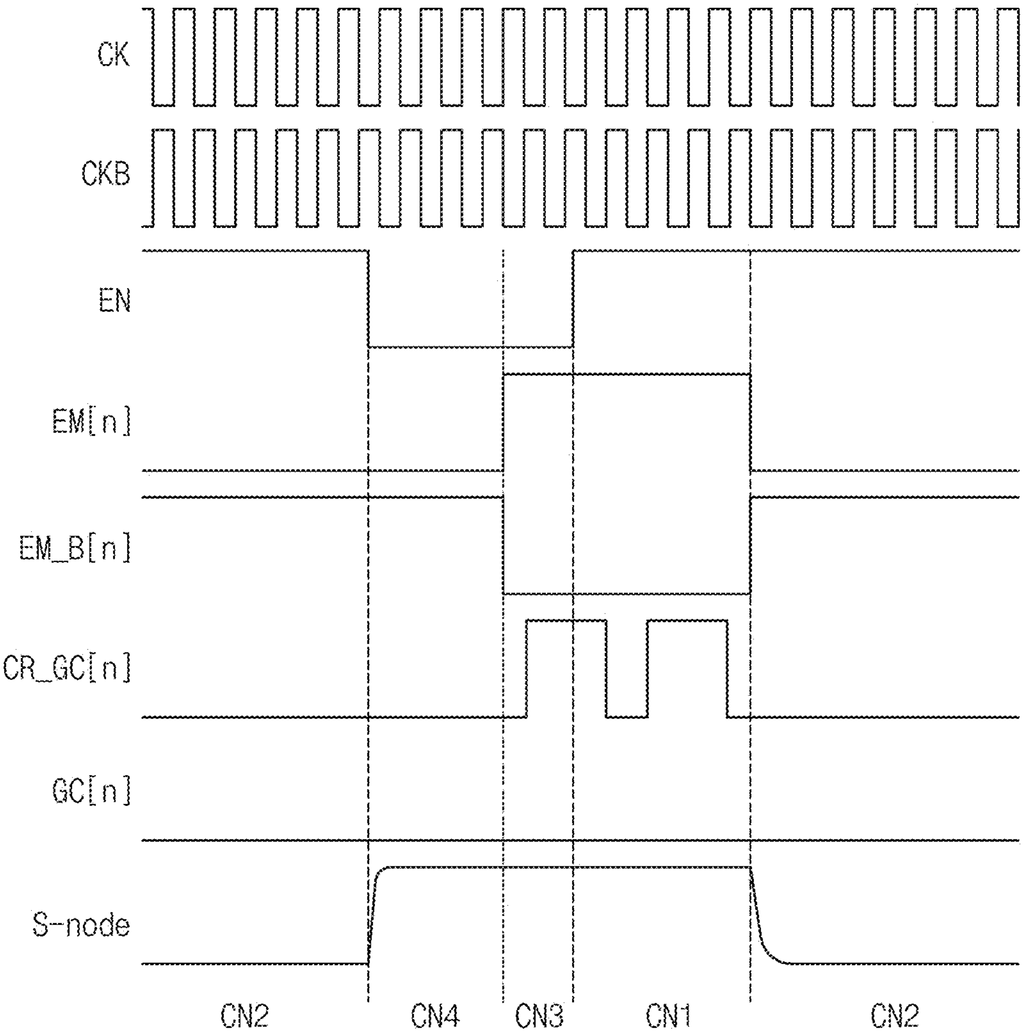
FIG. 14 is a signal timing diagram illustrating the input signals, the node signals and the output signals of the gate signal masking circuit of FIG. 9 when a time point when the emission signal is changed from the low level to the high level is included in the low period of the enable signal.

FIG. 11 is a table illustrating a status of the signal of the masking control node S_node according to the input signal of the gate signal masking circuit MC of FIG. 9. FIG. 12 is a signal timing diagram illustrating input signals, node signals and output signals of the gate signal masking circuit MC of FIG. 9 when a period when the emission signal EM[n] maintains a high level is included in a high period of the enable signal EN. FIG. 13 is a signal timing diagram illustrating the input signals, the node signals and the output signals of the gate signal masking circuit MC of FIG. 9 when a time point when the emission signal EM[n] is changed from a high level to a low level is included in a low period of the enable signal EN. FIG. 14 is a signal timing diagram illustrating the input signals, the node signals and the output signals of the gate signal masking circuit MC of FIG. 9 when a time point when the emission signal EM[n] is changed from the low level to the high level is included in the low period of the enable signal EN.

As shown in FIG. 11, the status of the signal of the masking control node S_node according to the input signals EN, EM[n] and EM_B[n] of the gate signal masking circuit MC may be shown in a table.

Referring to FIG. 11, when the enable signal EN has a high level and the signal EM[n] of the second input node has a high level, the signal of the masking control node S_node may maintain a previous status, that is, the signal of the masking control node S_node may not change. This condition may be defined as a first condition CN1.

When the enable signal EN has the high level and the signal EM[n] of the second input node has a low level, the signal of the masking control node S_node may have a low level. This condition may be defined as a second condition CN2.

When the enable signal EN has a low level and the signal EM[n] of the second input node has the high level, the signal of the masking control node S_node may maintain a previous status. This condition may be defined as a third condition CN3.

When the enable signal EN has the low level and the signal EM[n] of the second input node has the low level, the signal of the masking control node S_node may have a high level. This condition may be defined as a fourth condition CN4.

FIG. 12 represents a case in which a period when the emission signal EM[n] maintains a high level is included in a high period of the enable signal EN. In this case, the compensation gate signal GC[n] may be normally outputted.

As shown in FIG. 12, in a first period, the enable signal EN has the high level and the signal EM[n] of the second input node has the low level such that the second condition CN2 is satisfied and the signal of the masking control node S_node may have the low level. When the signal of the masking control node S_node has the low level, the first switching element S1 is turned on such that the gate signal GC[n] having a waveform the same as a waveform of the carry signal CR_GC[n] may be outputted.

In a second period, the enable signal EN has the low level and the signal EM[n] of the second input node has the low level such that the fourth condition CN4 is satisfied and the signal of the masking control node S_node may have the high level. When the signal of the masking control node S_node has the high level, the first switching element S1 is turned off such that the high pulse of the gate signal GC[n] may not be generated.

In a third period, the enable signal EN has the high level and the signal EM[n] of the second input node has the low level such that the second condition CN2 is satisfied and the signal of the masking control node S_node may have the low level.

In a fourth period, the enable signal EN has the high level and the signal EM[n] of the second input node has the high level such that the first condition CN1 is satisfied and the signal of the masking control node S_node may maintain the previous status (the low level). In the fourth period of FIG. 12, the carry signal CR_GC[n] has two high pulses and the gate signal GC[n] having the waveform same as the waveform of the carry signal CR_GC[n] may be outputted.

In a fifth period, the enable signal EN has the high level and the signal EM[n] of the second input node has the low level such that the second condition CN2 is satisfied and the signal of the masking control node S_node may have the low level.

FIG. 13 represents a case in which a time point when the emission signal EM[n] is changed from a high level to a low level is included in a low period of the enable signal EN. If the compensation gate signal GC[n] is already being outputted normally, the pulse of the compensation gate signal GC[n] may be continuously outputted even if the enable signal EN changes from high level to low level.

Periods in FIG. 13 sequentially satisfy the second condition CN2, the first condition CN1, the third condition CN3, the fourth condition CN4 and the second condition CN2. In the periods satisfying the first condition CN1 and the third condition CN3, two pulses of the compensation gate signal GC[n] may be normally outputted.

FIG. 14 represents a case in which a time point when the emission signal EM[n] is changed from the low level to the high level is included in the low period of the enable signal EN. If the enable signal EN is already at a low level before the normal output of the compensation gate signal GC[n], the pulse of the compensation gate signal GC[n] may not be outputted even if the enable signal EN changes from the low level to the high level.

Periods in FIG. 14 sequentially satisfy the second condition CN2, the fourth condition CN4, the third condition CN3, the first condition CN1 and the second condition CN2. In the periods satisfying the third condition CN3 and the first condition CN1, the pulses of the compensation gate signal GC[n] may not be outputted by the enable signal EN.

According to an embodiment, the output of the gate signal GC[n] may be controlled based on the enable signal EN, the signal GC_B[n] of the first input node of the first driver GCD and the signal EM[n] of the second input node of the second driver EMD and the signal EM_B[n] of the third input node of the second driver EMD such that the multiple division of the driving frequency may be supported.

Through the multiple division of the driving frequency, the power consumption of the display apparatus may be effectively reduced. In addition, the multiple division of the driving frequency of the gate signal GC[n] having two or more pulses may be supported.

Figure 15:
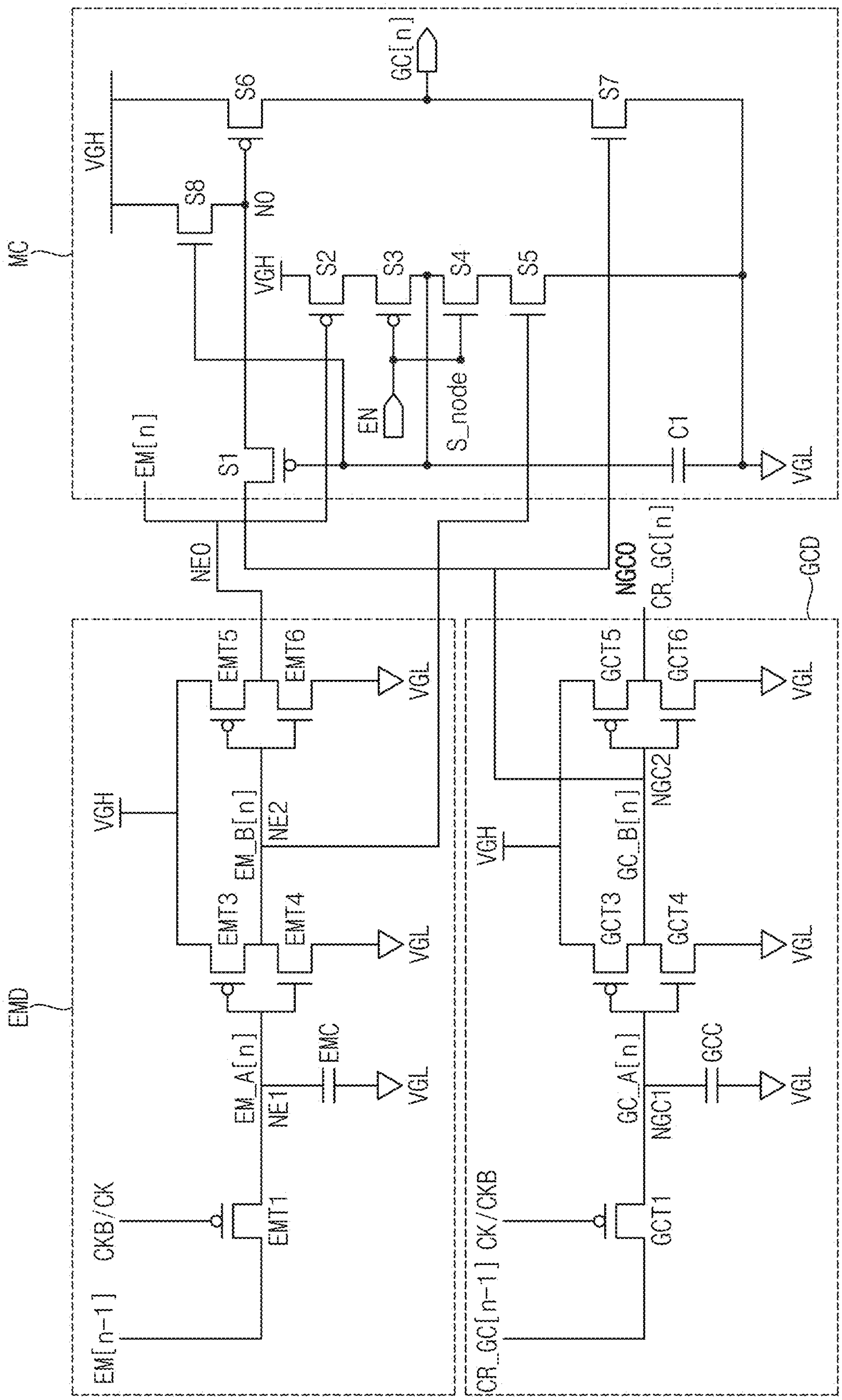
FIG. 15 is a circuit diagram illustrating a first driver, a second driver and a gate signal masking circuit of a gate emission driver according to an embodiment of the invention.

FIG. 15 is a circuit diagram illustrating a first driver GCD, a second driver EMD and a gate signal masking circuit MC of a gate emission driver according to an embodiment of the invention.

The gate signal masking circuit, the gate emission driver and the display apparatus of FIG. 15 are substantially the same as the gate signal masking circuit, the gate emission driver and the display apparatus according to the embodiments described above referring to FIGS. 1 to 14 except that the first driver does not include the second gate switching element and the second driver does not include the second emission switching element. Thus, the same reference numerals will be used to refer to the same or like parts as those described above with reference to FIGS. 1 to 14 and any repetitive detailed description thereof will be omitted or simplified.

Referring to FIGS. 1 to 8 and 10 to 15, in an embodiment, the first driver GCD may be a carry generator that generates a carry signal of the compensation gate signal GC. The first driver GCD may be a CMOS driver. The first driver GCD may generate a carry signal CR_GC[n] based on a previous carry signal CR_GC[n−1].

The first driver GCD may include a first gate switching element GCT1, a third gate switching element GCT3, a fourth gate switching element GCT4, a fifth gate switching element GCT5 and a sixth gate switching element GCT6.

The first gate switching element GCT1 may include a control electrode that receives one of a first clock signal CK and a second clock signal CKB, a first electrode that receives the previous carry signal CR_GC[n−1] and a second electrode connected to a first gate node NGC1. The third gate switching element GCT3 may include a control electrode connected to the first gate node NGC1, a first electrode that receives a first power voltage VGH and a second electrode connected to a second gate node NGC2. The fourth gate switching element GCT4 may include a control electrode connected to the first gate node NGC1, a first electrode connected to the second gate node NGC2 and a second electrode that receives a second power voltage VGL. The fifth gate switching element GCT5 may include a control electrode connected to the second gate node NGC2, a first electrode that receives the first power voltage VGH and a second electrode connected to a carry output node NGCO. The sixth gate switching element GCT6 may include a control electrode connected to the second gate node NGC2, a first electrode connected to the carry output node NGCO and a second electrode that receives the second power voltage VGL.

The first driver GCD may further include a gate capacitor GCC including a first electrode connected to the first gate node NGC1 and a second electrode that receives the second power voltage VGL.

In an embodiment, the first gate switching element GCT1, the third gate switching element GCT3 and the fifth gate switching element GCT5 may be P-type transistors. The fourth gate switching element GCT4 and the sixth gate switching element GCT6 may be N-type transistors.

The first gate switching element GCT1 may be synchronized with the first clock signal CK and the second clock signal CKB and may transmit the previous carry signal CR_GC[n−1] to the first gate node NGC1.

The second driver EMD may be an emission driver that generates the emission signal EM. The second driver EMD may be a CMOS driver. The second driver EMD may generate the emission signal EM[n] based on a previous emission signal EM[n−1].

The second driver EMD may include a first emission switching element EMT1, a third emission switching element EMT3, a fourth emission switching element EMT4, a fifth emission switching element EMT5 and a sixth emission switching element EMT6.

The first emission switching element EMT1 may include a control electrode that receives one of the first clock signal CK and the second clock signal CKB, a first electrode that receives the previous emission signal EM[n−1] and a second electrode connected to a first emission node NE1. The third emission switching element EMT3 may include a control electrode connected to the first emission node NE1, a first electrode that receives the first power voltage VGH and a second electrode connected to a second emission node NE2. The fourth emission switching element EMT4 may include a control electrode connected to the first emission node NE1, a first electrode connected to the second emission node NE2 and a second electrode that receives the second power voltage VGL. The fifth emission switching element EMT5 may include a control electrode connected to the second emission node NE2, a first electrode that receives the first power voltage VGH and a second electrode connected to an emission output node NEO. The sixth emission switching element EMT6 may include a control electrode connected to the second emission node NE2, a first electrode connected to the emission output node NEO and a second electrode that receives the second power voltage VGL.

The second driver EMD may further include an emission capacitor EMC including a first electrode connected to the first emission node NE1 and a second electrode that receives the second power voltage VGL.

The first emission switching element EMT1, the third emission switching element EMT3 and the fifth emission switching element EMT5 may be P-type transistors. The fourth emission switching element EMT4 and the sixth emission switching element EMT6 may be N-type transistors.

The first emission switching element EMT1 may be synchronized with the first clock signal CK and the second clock signal CKB and may transmit the previous emission signal EM[n−1] to the first emission node NE1.

The gate signal masking circuit MC may control the output of the gate signal GC[n] based on the enable signal EN, the signal GC_B[n] of the first input node connected to the second gate node NGC2 of the first driver GCD, the signal EM[n] of the second input node connected to the emission output node NEO of the second driver EMD and the signal EM_B[n] of the third input node connected to the second emission node NE2 of the second driver EMD.

In an embodiment, for example, the first input node of the gate signal masking circuit MC may be referred to as the second gate node NGC2. In an embodiment, for example, the second input node of the gate signal masking circuit MC may be referred to as the emission output node NEO. In an embodiment, for example, the third input node of the gate signal masking circuit MC may be referred to as the second emission node NE2.

According to an embodiment, the output of the gate signal GC[n] may be controlled based on the enable signal EN, the signal GC_B[n] of the first input node of the first driver GCD and the signal EM[n] of the second input node of the second driver EMD and the signal EM_B[n] of the third input node of the second driver EMD such that the multiple division of the driving frequency may be supported.

Through the multiple division of the driving frequency, the power consumption of the display apparatus may be effectively reduced. In addition, the multiple division of the driving frequency of the gate signal GC[n] having two or more pulses may be supported.

Figure 16:
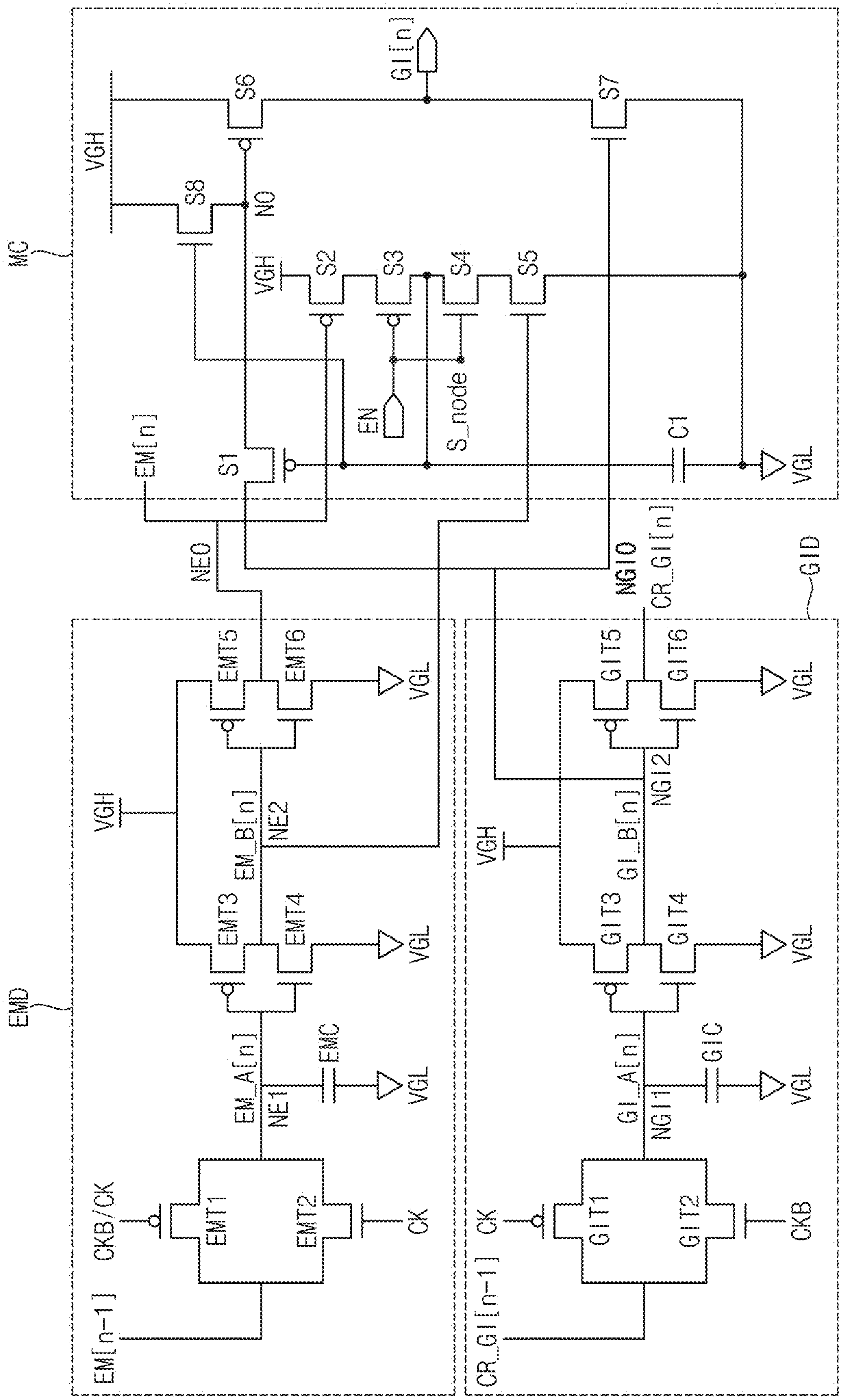
FIG. 16 is a circuit diagram illustrating a first driver, a second driver and a gate signal masking circuit of a gate emission driver according to an embodiment of the invention.

FIG. 16 is a circuit diagram illustrating a first driver GID, a second driver EMD and a gate signal masking circuit MC of a gate emission driver according to an embodiment of the invention.

The gate signal masking circuit, the gate emission driver and the display apparatus of FIG. 16 are substantially the same as the gate signal masking circuit, the gate emission driver and the display apparatus according to the embodiments described above referring to FIGS. 1 to 14 except that the first driver generates a carry signal of a data initialization gate signal and the gate signal masking circuit generates the data initialization gate signal. Thus, the same reference numerals will be used to refer to the same or like parts as those described in the previous embodiment of FIGS. 1 to 14 and any repetitive detailed description thereof will be omitted or simplified.

Referring to FIGS. 1 to 8, 10 to 14 and 16, in an embodiment, the first driver GID may be a carry generator that generates a carry signal of the data initialization gate signal GI. The first driver GID may be a CMOS driver. The first driver GID may generate a carry signal CR_GI[n] based on a previous carry signal CR_GI[n−1].

The first driver GID may include a first gate switching element GIT1, a second gate switching element GIT2, a third gate switching element GIT3, a fourth gate switching element GIT4, a fifth gate switching element GIT5 and a sixth gate switching element GIT6.

The first gate switching element GIT1 may include a control electrode that receives one of a first clock signal CK and a second clock signal CKB, a first electrode that receives the previous carry signal CR_GI[n−1] and a second electrode connected to a first gate node NGI1. The second gate switching element GIT2 may include a control electrode that receives one of the first clock signal CK and the second clock signal CKB, a first electrode that receives the previous carry signal CR_GI[n−1] and a second electrode connected to the first gate node NGI1. The third gate switching element GIT3 may include a control electrode connected to the first gate node NGI1, a first electrode that receives a first power voltage VGH and a second electrode connected to a second gate node NGI2. The fourth gate switching element GIT4 may include a control electrode connected to the first gate node NGI1, a first electrode connected to the second gate node NGI2 and a second electrode that receives a second power voltage VGL. The fifth gate switching element GIT5 may include a control electrode connected to the second gate node NGI2, a first electrode that receives the first power voltage VGH and a second electrode connected to a carry output node NGIO. The sixth gate switching element GIT6 may include a control electrode connected to the second gate node NGI2, a first electrode connected to the carry output node NGIO and a second electrode that receives the second power voltage VGL.

In an embodiment, the first power voltage VGH and the second power voltage VGL may be power voltages of the gate emission driver 300. In an embodiment, for example, the first power voltage VGH may be greater than the second power voltage VGL.

When the first clock signal CK is applied to the control electrode of the first gate switching element GIT1, the second clock signal CKB may be applied to the control electrode of the second gate switching element GIT2. In contrast, when the second clock signal CKB is applied to the control electrode of the first gate switching element GIT1, the first clock signal CK may be applied to the control electrode of the second gate switching element GIT2.

The first driver GID may further include a gate capacitor GIC including a first electrode connected to the first gate node NGI1 and a second electrode that receives the second power voltage VGL.

The first gate switching element GIT1, the third gate switching element GIT3 and the fifth gate switching element GIT5 may be P-type transistors. The second gate switching element GIT2, the fourth gate switching element GIT4 and the sixth gate switching element GIT6 may be N-type transistors.

The first gate switching element GIT1 and the second gate switching element GIT2 may be synchronized with the first clock signal CK and the second clock signal CKB and may transmit the previous carry signal CR_GI[n−1] to the first gate node NGI1.

The third gate switching element GIT3 and the fourth gate switching element GIT4 may invert the signal GI_A[n] of the first gate node NGI1 and may transmit the inverted signal to the second gate node NGI2.

The fifth gate switching element GIT5 and the sixth gate switching element GIT6 may invert the signal GI_B[n] of the second gate node NGI2 and may output the inverted signal to the carry output node NGIO.

The carry output node NGIO may output the carry signal GI_CR[n].

The second driver EMD may be an emission driver that generates the emission signal EM. The second driver EMD may be a CMOS driver. The second driver EMD may generate the emission signal EM[n] based on a previous emission signal EM[n−1].

The gate signal masking circuit MC may control the output of the gate signal GI[n] based on the enable signal EN, the signal GI_B[n] of the first input node connected to the second gate node NGI2 of the first driver GID, the signal EM[n] of the second input node connected to the emission output node NEO of the second driver EMD and the signal EM_B[n] of the third input node connected to the second emission node NE2 of the second driver EMD.

In an embodiment, for example, the first input node of the gate signal masking circuit MC may be referred to as the second gate node NGI2. In an embodiment, for example, the second input node of the gate signal masking circuit MC may be referred to as the emission output node NEO. In an embodiment, for example, the third input node of the gate signal masking circuit MC may be referred to as the second emission node NE2.

According to an embodiment, the output of the gate signal GI[n] may be controlled based on the enable signal EN, the signal GI_B[n] of the first input node of the first driver GID and the signal EM[n] of the second input node of the second driver EMD and the signal EM_B[n] of the third input node of the second driver EMD such that the multiple division of the driving frequency may be supported.

Through the multiple division of the driving frequency, the power consumption of the display apparatus may be effectively reduced.

Figure 17:
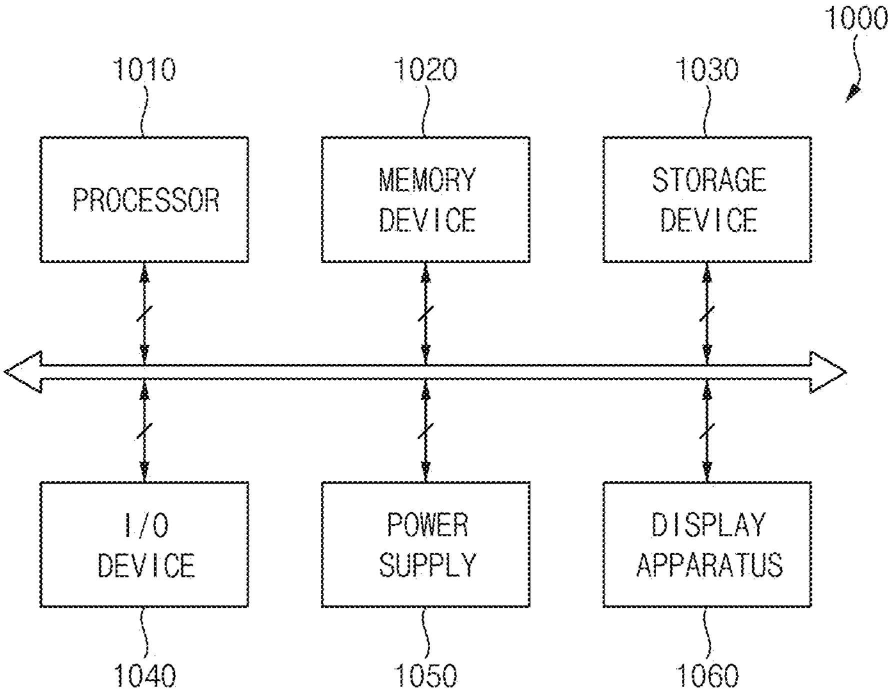
FIG. 17 is a block diagram illustrating an electronic apparatus according to an embodiment of the invention.
Figure 18:
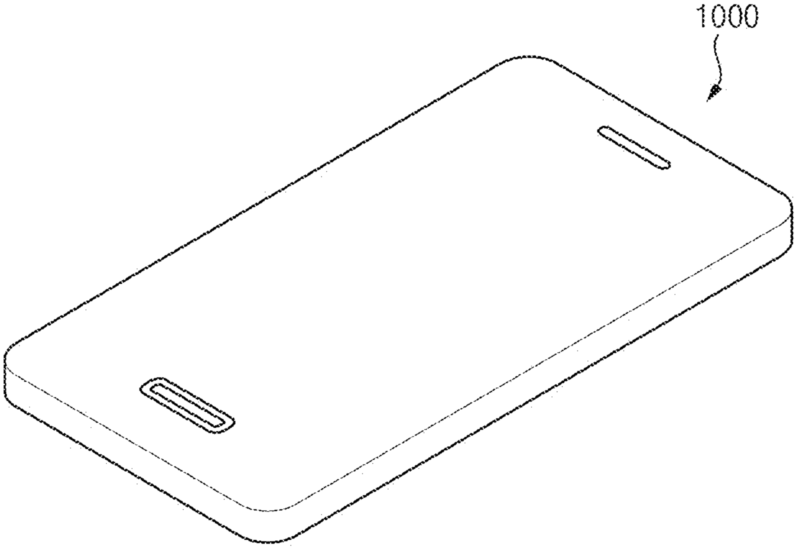
FIG. 18 is a diagram illustrating an example in which the electronic apparatus of FIG. 17 is implemented as a smart phone.

FIG. 17 is a block diagram illustrating an electronic apparatus according to an embodiment of the invention. FIG. 18 is a diagram illustrating an example in which the electronic apparatus of FIG. 17 is implemented as a smart phone.

Referring to FIGS. 17 and 18, an embodiment of the electronic apparatus 1000 may include a processor 1010, a memory device 1020, a storage device 1030, an input/output (I/O) device 1040, a power supply 1050, and a display apparatus 1060. Here, the display apparatus 1060 may be the display apparatus of FIG. 1. In addition, the electronic apparatus 1000 may further include a plurality of ports for communicating with a video card, a sound card, a memory card, a universal serial bus (USB) device, other electronic apparatuses, etc.

In an embodiment, as illustrated in FIG. 18, the electronic apparatus 1000 may be implemented as a smart phone. However, the electronic apparatus 1000 is not limited thereto. In another embodiment, for example, the electronic apparatus 1000 may be implemented as a cellular phone, a video phone, a smart pad, a smart watch, a tablet computer, a car navigation system, a computer monitor, a laptop, a head mounted display (HMD) device, or the like.

The processor 1010 may perform various computing functions or various tasks. The processor 1010 may be a micro-processor, a central processing unit (CPU), an application processor (AP), or the like. The processor 1010 may be coupled to other components via an address bus, a control bus, a data bus, etc. Further, the processor 1010 may be coupled to an extended bus such as a peripheral component interconnection (PCI) bus.

The processor 1010 may output the input image data IMG and the input control signal CONT to the driving controller 200 of FIG. 1.

The memory device 1020 may store data for operations of the electronic apparatus 1000. For example, the memory device 1020 may include at least one non-volatile memory device such as an erasable programmable read-only memory (EPROM) device, an electrically erasable programmable read-only memory (EEPROM) device, a flash memory device, a phase change random access memory (PRAM) device, a resistance random access memory (RRAM) device, a nano floating gate memory (NFGM) device, a polymer random access memory (PoRAM) device, a magnetic random access memory (MRAM) device, a ferroelectric random access memory (FRAM) device, or the like and/or at least one volatile memory device such as a dynamic random access memory (DRAM) device, a static random access memory (SRAM) device, a mobile DRAM device, or the like.

The storage device 1030 may include a solid state drive (SSD) device, a hard disk drive (HDD) device, a CD-ROM device, or the like. The I/O device 1040 may include an input device such as a keyboard, a keypad, a mouse device, a touch-pad, a touch-screen, or the like and an output device such as a printer, a speaker, or the like. In some embodiments, the display apparatus 1060 may be included in the I/O device 1040. The power supply 1050 may provide power for operations of the electronic apparatus 1000. The display apparatus 1060 may be coupled to other components via the buses or other communication links.

According to the embodiments of the gate signal masking circuit, the gate emission driver and the display apparatus, the power consumption of the display apparatus may be reduced.

The invention should not be construed as being limited to the embodiments set forth herein. Rather, these embodiments are provided so that this disclosure will be thorough and complete and will fully convey the concept of the invention to those skilled in the art.

While the invention has been particularly shown and described with reference to embodiments thereof, it will be understood by those of ordinary skill in the art that various changes in form and details may be made therein without departing from the spirit or scope of the invention as defined by the following claims.

What is claimed is:

1. A gate signal masking circuit comprising:

a first switching element including a control electrode connected to a masking control node, a first electrode connected to a first input node and a second electrode connected to an output control node;

a second switching element including a control electrode connected to a second input node, a first electrode which receives a first power voltage and a second electrode connected to a first intermediate node;

a third switching element including a control electrode which receives an enable signal, a first electrode connected to the first intermediate node and a second electrode connected to the masking control node;

a fourth switching element including a control electrode which receives the enable signal, a first electrode connected to the masking control node and a second electrode connected to a second intermediate node; and a fifth switching element including a control electrode connected to a third input node, a first electrode connected to the second intermediate node and a second electrode which receives a second power voltage, wherein the second switching element and the third switching element are P-type transistors, and wherein the fourth switching element and the fifth switching element are N-type transistors.

2. The gate signal masking circuit of claim 1, further comprising:

a sixth switching element including a control electrode connected to the output control node, a first electrode which receives the first power voltage and a second electrode connected to a gate output node; and a seventh switching element including a control electrode connected to the first input node, a first electrode connected to the gate output node and a second electrode which receives the second power voltage.

3. The gate signal masking circuit of claim 2, further comprising:

an eighth switching element including a control electrode connected to the masking control node, a first electrode which receives the first power voltage and a second electrode connected to the output control node.

4. The gate signal masking circuit of claim 2, further comprising:

a first capacitor including a first electrode connected to the masking control node and a second electrode which receives the second power voltage.

5. The gate signal masking circuit of claim 1, wherein a signal of the third input node is an inverted signal of a signal of the second input node.

6. The gate signal masking circuit of claim 1, wherein when the enable signal has a high level and a signal of the second input node has a high level, a signal of the masking control node maintains a previous status.

7. The gate signal masking circuit of claim 1, wherein when the enable signal has a high level and a signal of the second input node has a low level, a signal of the masking control node has a low level.

8. The gate signal masking circuit of claim 1, wherein when the enable signal has a low level and a signal of the second input node has a high level, a signal of the masking control node maintains a previous status.

9. The gate signal masking circuit of claim 1, wherein when the enable signal has a low level and a signal of the second input node has a low level, a signal of the masking control node has a high level.

10. A gate emission driver comprising:

a first driver which generates a carry signal based on a previous carry signal;

a second driver which generates an emission signal based on a previous emission signal; and a gate signal masking circuit which controls an output of a gate signal based on an enable signal, a signal of a first input node connected to the first driver and a signal of a second input node connected to an emission output node of the second driver and a signal of a third input node connected to the second driver.

11. The gate emission driver of claim 10, wherein the gate signal masking circuit comprises:

a first switching element including a control electrode connected to a masking control node, a first electrode connected to the first input node and a second electrode connected to an output control node;

a second switching element including a control electrode connected to the second input node, a first electrode which receives a first power voltage and a second electrode connected to a first intermediate node;

a third switching element including a control electrode which receives the enable signal, a first electrode connected to the first intermediate node and a second electrode connected to the masking control node;

a fourth switching element including a control electrode which receives the enable signal, a first electrode connected to the masking control node and a second electrode connected to a second intermediate node; and a fifth switching element including a control electrode connected to the third input node, a first electrode connected to the second intermediate node and a second electrode which receives a second power voltage, wherein the second switching element and the third switching element are P-type transistors, and wherein the fourth switching element and the fifth switching element are N-type transistors.

12. The gate emission driver of claim 11, wherein the gate signal masking circuit further comprises:

a sixth switching element including a control electrode connected to the output control node, a first electrode which receives the first power voltage and a second electrode connected to a gate output node;

a seventh switching element including a control electrode connected to the first input node, a first electrode connected to the gate output node and a second electrode which receives the second power voltage; and an eighth switching element including a control electrode connected to the masking control node, a first electrode which receives the first power voltage and a second electrode connected to the output control node.

13. The gate emission driver of claim 11, wherein the first driver comprises:

a first gate switching element including a control electrode which receives one of a first clock signal and a second clock signal, a first electrode which receives the previous carry signal and a second electrode connected to a first gate node;

a third gate switching element including a control electrode connected to the first gate node, a first electrode which receives the first power voltage and a second electrode connected to a second gate node;

a fourth gate switching element including a control electrode connected to the first gate node, a first electrode connected to the second gate node and a second electrode which receives the second power voltage;

a fifth gate switching element including a control electrode connected to the second gate node, a first electrode which receives the first power voltage and a second electrode connected to a carry output node; and a sixth gate switching element including a control electrode connected to the second gate node, a first electrode connected to the carry output node and a second electrode which receives the second power voltage, wherein the first gate switching element, the third gate switching element and the fifth gate switching element are P-type transistors, and wherein the fourth gate switching element and the sixth gate switching element are N-type transistors.

14. The gate emission driver of claim 11, wherein the second driver comprises:

a first emission switching element including a control electrode which receives one of a first clock signal and a second clock signal, a first electrode which receives the previous emission signal and a second electrode connected to a first emission node;

a second emission switching element including a control electrode which receives the other of the first clock signal and the second clock signal, a first electrode which receives the previous emission signal and a second electrode connected to the first emission node;

a third emission switching element including a control electrode connected to the first emission node, a first electrode which receives the first power voltage and a second electrode connected to a second emission node;

a fourth emission switching element including a control electrode connected to the first emission node, a first electrode connected to the second emission node and a second electrode which receives the second power voltage;

a fifth emission switching element including a control electrode connected to the second emission node, a first electrode which receives the first power voltage and a second electrode connected to the emission output node; and a sixth emission switching element including a control electrode connected to the second emission node, a first electrode connected to the emission output node and a second electrode which receives the second power voltage, wherein the first emission switching element, the third emission switching element and the fifth emission switching element are P-type transistors, and wherein the second emission switching element, the fourth emission switching element and the sixth emission switching element are N-type transistors.

15. The gate emission driver of claim 14, wherein the second input node is connected to the emission output node, and wherein the third input node is connected to the second emission node.

16. The gate emission driver of claim 11, wherein the second driver comprises:

a first emission switching element including a control electrode which receives one of a first clock signal and a second clock signal, a first electrode which receives the previous emission signal and a second electrode connected to a first emission node;

a third emission switching element including a control electrode connected to the first emission node, a first electrode which receives the first power voltage and a second electrode connected to a second emission node;

a fourth emission switching element including a control electrode connected to the first emission node, a first electrode connected to the second emission node and a second electrode which receives the second power voltage;

a fifth emission switching element including a control electrode connected to the second emission node, a first electrode which receives the first power voltage and a second electrode connected to the emission output node; and a sixth emission switching element including a control electrode connected to the second emission node, a first electrode connected to the emission output node and a second electrode which receives the second power voltage, wherein the first emission switching element, the third emission switching element and the fifth emission switching element are P-type transistors, and wherein the fourth emission switching element and the sixth emission switching element are N-type transistors.

17. The gate emission driver of claim 11, wherein the first driver comprises:

a first gate switching element including a control electrode which receives one of a first clock signal and a second clock signal, a first electrode which receives the previous carry signal and a second electrode connected to a first gate node;

a second gate switching element including a control electrode which receives the other of the first clock signal and the second clock signal, a first electrode which receives the previous carry signal and a second electrode connected to the first gate node;

a third gate switching element including a control electrode connected to the first gate node, a first electrode which receives the first power voltage and a second electrode connected to a second gate node;

a fourth gate switching element including a control electrode connected to the first gate node, a first electrode connected to the second gate node and a second electrode which receives the second power voltage;

a fifth gate switching element including a control electrode connected to the second gate node, a first electrode which receives the first power voltage and a second electrode connected to a carry output node; and a sixth gate switching element including a control electrode connected to the second gate node, a first electrode connected to the carry output node and a second electrode which receives the second power voltage, wherein the first gate switching element, the third gate switching element and the fifth gate switching element are P-type transistors, and wherein the second gate switching element, the fourth gate switching element and the sixth gate switching element are N-type transistors.

18. The gate emission driver of claim 17, wherein the first input node is connected to the second gate node.

19. A display apparatus comprising:

a display panel including a pixel;

a gate emission driver which outputs a gate signal and an emission signal to the pixel; and a data driver which outputs a data voltage to the pixel, wherein the gate emission driver comprises:

a first driver which generates a carry signal based on a previous carry signal;

a second driver which generates the emission signal based on a previous emission signal; and a gate signal masking circuit which controls an output of the gate signal based on an enable signal, a signal of a first input node connected to the first driver and a signal of a second input node connected to an emission output node of the second driver and a signal of a third input node connected to the second driver.

20. The display apparatus of claim 19, wherein the gate signal masking circuit comprises:

a first switching element including a control electrode connected to a masking control node, a first electrode connected to the first input node and a second electrode connected to an output control node;

a second switching element including a control electrode connected to the second input node, a first electrode which receives a first power voltage and a second electrode connected to a first intermediate node;

a third switching element including a control electrode which receives the enable signal, a first electrode connected to the first intermediate node and a second electrode connected to the masking control node;

a fourth switching element including a control electrode which receives the enable signal, a first electrode connected to the masking control node and a second electrode connected to a second intermediate node; and a fifth switching element including a control electrode connected to the third input node, a first electrode connected to the second intermediate node and a second electrode which receives a second power voltage, wherein the second switching element and the third switching element are P-type transistors, and wherein the fourth switching element and the fifth switching element are N-type transistors.

21. The display apparatus of claim 20, wherein the gate signal masking circuit further comprises:

a sixth switching element including a control electrode connected to the output control node, a first electrode which receives the first power voltage and a second electrode connected to a gate output node;

a seventh switching element including a control electrode connected to the first input node, a first electrode connected to the gate output node and a second electrode which receives the second power voltage; and an eighth switching element including a control electrode connected to the masking control node, a first electrode which receives the first power voltage and a second electrode connected to the output control node.

22. The display apparatus of claim 20, wherein the first driver comprises:

a first gate switching element including a control electrode which receives one of a first clock signal and a second clock signal, a first electrode which receives the previous carry signal and a second electrode connected to a first gate node;

a second gate switching element including a control electrode which receives the other of the first clock signal and the second clock signal, a first electrode which receives the previous carry signal and a second electrode connected to the first gate node;

a third gate switching element including a control electrode connected to the first gate node, a first electrode which receives the first power voltage and a second electrode connected to a second gate node;

a fourth gate switching element including a control electrode connected to the first gate node, a first electrode connected to the second gate node and a second electrode which receives the second power voltage;

a fifth gate switching element including a control electrode connected to the second gate node, a first electrode which receives the first power voltage and a second electrode connected to a carry output node; and a sixth gate switching element including a control electrode connected to the second gate node, a first electrode connected to the carry output node and a second electrode which receives the second power voltage, wherein the first gate switching element, the third gate switching element and the fifth gate switching element are P-type transistors, and wherein the second gate switching element, the fourth gate switching element and the sixth gate switching element are N-type transistors.

23. The display apparatus of claim 22, wherein the first input node is connected to the second gate node.

24. The display apparatus of claim 20, wherein the pixel comprises:

a first pixel switching element including a control electrode connected to a first pixel node, a first electrode connected to a second pixel node and a second electrode connected to a third pixel node;

a second pixel switching element including a control electrode which receives a data writing gate signal, a first electrode which receives the data voltage and a second electrode connected to the second pixel node;

a third pixel switching element including a control electrode which receives a compensation gate signal, a first electrode connected to the first pixel node and a second electrode connected to the third pixel node;

a fourth pixel switching element including a control electrode which receives a data initialization gate signal, a first electrode which receives an initialization voltage and a second electrode connected to the first pixel node;

a fifth pixel switching element including a control electrode which receives the emission signal, a first electrode which receives a pixel high power voltage and a second electrode connected to the second pixel node;

a sixth pixel switching element including a control electrode which receives the emission signal, a first electrode connected to the third pixel node and a second electrode connected to an anode electrode of a light emitting element;

a seventh pixel switching element including a control electrode which receives a light emitting element initialization gate signal, a first electrode which receives a light emitting element initialization voltage and a second electrode connected to the anode electrode of the light emitting element; and the light emitting element including the anode electrode and a cathode electrode which receives a pixel low power voltage, and wherein the gate signal is the compensation gate signal.

25. The display apparatus of claim 20, wherein the pixel comprises:

a first pixel switching element including a control electrode connected to a first pixel node, a first electrode connected to a second pixel node and a second electrode connected to a third pixel node;

a second pixel switching element including a control electrode which receives a data writing gate signal, a first electrode which receives the data voltage and a second electrode connected to the second pixel node;

a third pixel switching element including a control electrode which receives a compensation gate signal, a first electrode connected to the first pixel node and a second electrode connected to the third pixel node;

a fourth pixel switching element including a control electrode which receives a data initialization gate signal, a first electrode which receives an initialization voltage and a second electrode connected to the first pixel node;

a fifth pixel switching element including a control electrode which receives the emission signal, a first electrode which receives a pixel high power voltage and a second electrode connected to the second pixel node;

a sixth pixel switching element including a control electrode which receives the emission signal, a first electrode connected to the third pixel node and a second electrode connected to an anode electrode of a light emitting element;

a seventh pixel switching element including a control electrode which receives a light emitting element initialization gate signal, a first electrode which receives a light emitting element initialization voltage and a second electrode connected to the anode electrode of the light emitting element; and the light emitting element including the anode electrode and a cathode electrode which receives a pixel low power voltage, and wherein the gate signal is the data initialization gate signal.

26. The display apparatus of claim 20, wherein the pixel comprises:

a first pixel switching element including a control electrode connected to a first pixel node, a first electrode connected to a second pixel node and a second electrode connected to a third pixel node;

a second pixel switching element including a control electrode which receives a data writing gate signal, a first electrode which receives the data voltage and a second electrode connected to the second pixel node;

a third pixel switching element including a control electrode which receives a compensation gate signal, a first electrode connected to the first pixel node and a second electrode connected to the third pixel node;

a fourth pixel switching element including a control electrode which receives a data initialization gate signal, a first electrode which receives an initialization voltage and a second electrode connected to the first pixel node;

a fifth pixel switching element including a control electrode which receives the emission signal, a first electrode which receives a pixel high power voltage and a second electrode connected to the second pixel node;

a sixth pixel switching element including a control electrode which receives the emission signal, a first electrode connected to the third pixel node and a second electrode connected to an anode electrode of a light emitting element;

a seventh pixel switching element including a control electrode which receives a light emitting element initialization gate signal, a first electrode which receives a light emitting element initialization voltage and a second electrode connected to the anode electrode of the light emitting element; and the light emitting element including the anode electrode and a cathode electrode which receives a pixel low power voltage, wherein the light emitting element initialization gate signal is a data writing gate signal of a previous stage, and wherein the gate signal is one of the compensation gate signal and the data initialization gate signal.

27. The display apparatus of claim 20, wherein the pixel comprises:

a first pixel switching element including a control electrode connected to a first pixel node, a first electrode connected to a second pixel node and a second electrode connected to a third pixel node;

a second pixel switching element including a control electrode which receives a data writing gate signal, a first electrode which receives the data voltage and a second electrode connected to the second pixel node;

a third pixel switching element including a control electrode which receives a compensation gate signal, a first electrode connected to the first pixel node and a second electrode connected to the third pixel node;

a fourth pixel switching element including a control electrode which receives a data initialization gate signal, a first electrode which receives an initialization voltage and a second electrode connected to the first pixel node;

a fifth pixel switching element including a control electrode which receives the emission signal, a first electrode which receives a pixel high power voltage and a second electrode connected to the second pixel node;

a sixth pixel switching element including a control electrode which receives the emission signal, a first electrode connected to the third pixel node and a second electrode connected to an anode electrode of a light emitting element;

a seventh pixel switching element including a control electrode which receives a light emitting element initialization gate signal, a first electrode which receives a light emitting element initialization voltage and a second electrode connected to the anode electrode of the light emitting element;

an eighth pixel switching element including a control electrode which receives a bias gate signal, a first electrode which receives a bias voltage and a second electrode connected to the second pixel node, and the light emitting element including the anode electrode and a cathode electrode which receives a pixel low power voltage, and wherein the gate signal is one of the compensation gate signal and the data initialization gate signal.

* * * * *